US008898555B2

(12) United States Patent
Kanawa

(10) Patent No.: US 8,898,555 B2
(45) Date of Patent: Nov. 25, 2014

(54) APPARATUS, METHOD, AND COMPUTER PROGRAM PRODUCT FOR MANAGING STRUCTURED DOCUMENTS

(75) Inventor: Takuya Kanawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1599 days.

(21) Appl. No.: 12/040,996

(22) Filed: Mar. 3, 2008

(65) Prior Publication Data

US 2008/0240619 A1 Oct. 2, 2008

(30) Foreign Application Priority Data

Mar. 26, 2007 (JP) ................................. 2007-079379

(51) Int. Cl.
*G06K 9/54* (2006.01)
*G06F 17/22* (2006.01)
*G06F 17/27* (2006.01)

(52) U.S. Cl.
CPC ............ *G06F 17/2247* (2013.01); *G06F 17/27* (2013.01)
USPC ............ 715/205; 715/206; 715/234; 715/235

(58) Field of Classification Search
CPC .............................. G06F 17/2247; G06F 17/27
USPC ................. 715/234, 241, 255, 205, 206, 235; 707/736, 741
See application file for complete search history.

(56) References Cited

U.S. PATENT DOCUMENTS

| | | | | |
|---|---|---|---|---|
| 4,959,785 A * | 9/1990 | Yamamoto et al. | ........... | 715/234 |
| 5,614,899 A * | 3/1997 | Tokuda et al. | .................. | 341/51 |
| 5,978,812 A * | 11/1999 | Inokuchi et al. | ....................... | 1/1 |
| 6,058,392 A * | 5/2000 | Sampson et al. | ....................... | 1/1 |
| 6,510,434 B1 * | 1/2003 | Anderson et al. | ...................... | 1/1 |
| 7,054,854 B1 | 5/2006 | Hattori et al. | | |
| 7,080,073 B1 * | 7/2006 | Jiang et al. | ............................ | 1/1 |
| 7,139,973 B1 * | 11/2006 | Kirkwood et al. | ............ | 715/206 |

(Continued)

FOREIGN PATENT DOCUMENTS

| | | |
|---|---|---|
| JP | 2001-147933 | 5/2001 |
| JP | 2006-073035 | 3/2006 |
| JP | 2006099181 | 4/2006 |
| JP | 2007034827 | 2/2007 |

OTHER PUBLICATIONS

Curtmola, et al., Gala Tex: A Conformant Implementation of the XQuery Full-Text Language, 2005.

(Continued)

*Primary Examiner* — Stephen Hong
*Assistant Examiner* — Marshon Robinson
(74) *Attorney, Agent, or Firm* — Amin, Turocy & Watson, LLP

(57) ABSTRACT

An index storing unit stores, in a page as a fixed-length storage area, a vocabulary index which associates vocabulary identifiers for identifying vocabularies included in a structured document having a layered logical structure and specific information for specifying positions where the vocabularies appear. A characteristic analyzing unit analyzes a characteristic concerning a distribution of the specific information included in the vocabulary index stored in the page. A dividing unit divides the page into a plurality of blocks including one of a plurality of the vocabulary indexes based on the characteristic analyzed by the characteristic analyzing unit, calculates a first range representing a range of the specific information of the vocabulary indexes included in the blocks, and stores the first range in each of the divided blocks in the index storing unit.

10 Claims, 22 Drawing Sheets

(56) References Cited

U.S. PATENT DOCUMENTS

| | | | |
|---|---|---|---|
| 7,213,203 B2* | 5/2007 | Dunietz et | 715/251 |
| 7,502,773 B1* | 3/2009 | Shakib et al. | 1/1 |
| 7,509,477 B2* | 3/2009 | Suponau et al. | 711/216 |
| 7,702,618 B1* | 4/2010 | Patterson | 707/999.003 |
| 8,086,594 B1* | 12/2011 | Cao et al. | 707/713 |
| 2001/0018685 A1* | 8/2001 | Saito et al. | 707/3 |
| 2002/0032693 A1* | 3/2002 | Chiou et al. | 707/500 |
| 2002/0059166 A1* | 5/2002 | Wang et al. | 707/1 |
| 2002/0073104 A1* | 6/2002 | Nunez | 707/200 |
| 2002/0078036 A1* | 6/2002 | Miller et al. | 707/3 |
| 2004/0170325 A1* | 9/2004 | Eichhorn et al. | 382/205 |
| 2005/0108001 A1* | 5/2005 | Aarskog | 704/10 |
| 2007/0027671 A1 | 2/2007 | Kanawa | |
| 2007/0143235 A1* | 6/2007 | Kummamuru et al. | 706/15 |
| 2008/0034175 A1* | 2/2008 | Traister et al. | 711/159 |
| 2008/0294619 A1* | 11/2008 | Hamilton et al. | 707/5 |
| 2008/0301256 A1* | 12/2008 | McWilliams et al. | 709/214 |
| 2008/0301359 A1* | 12/2008 | Smith et al. | 711/103 |
| 2009/0125701 A1* | 5/2009 | Suponau et al. | 711/216 |
| 2009/0164887 A1* | 6/2009 | Ikegami | 715/247 |
| 2009/0228777 A1* | 9/2009 | Henry et al. | 715/230 |
| 2009/0265310 A1* | 10/2009 | Lee | 707/3 |

OTHER PUBLICATIONS

Japanese Office Action dated Jun. 30, 2009 corresponding to U.S. Appl. No. 12/040,996, filed Mar. 3, 2008.

Kanawa Takuya, "XQuery-Full-Text Processing and Scoring Method in a Native XML Database System", study report of Information Processing Society of Japan (IPSJ), Japan, Information Processing Society of Japan (IPSJ), Sep. 30, 2005, No. 96, pp. 1-8.

Toshiyuki, Shimizu, et al., "Technology on XML Data Management and Stream Process", journal of The Institute of Electronics, Information and Communication Engineers (IEICE), Japan, The Institute of Electronics, Information and Communication Engineers (IEICE), Feb. 1, 2007, vol. J90-D, No. 2, pp. 159-184.

Aburai, Makoto, et al., "XML Storage Based on DTM for Effective XQuery Processing", Technical Report of The Institute of Electronics, Information and Communication Engineers (IEICE), Japan, The Institute of Electronics, Information and Communication Engineers (IEICE), Jul. 5, 2006, vol. 106, No. 148, pp. 73-78, (DE2006-34).

* cited by examiner

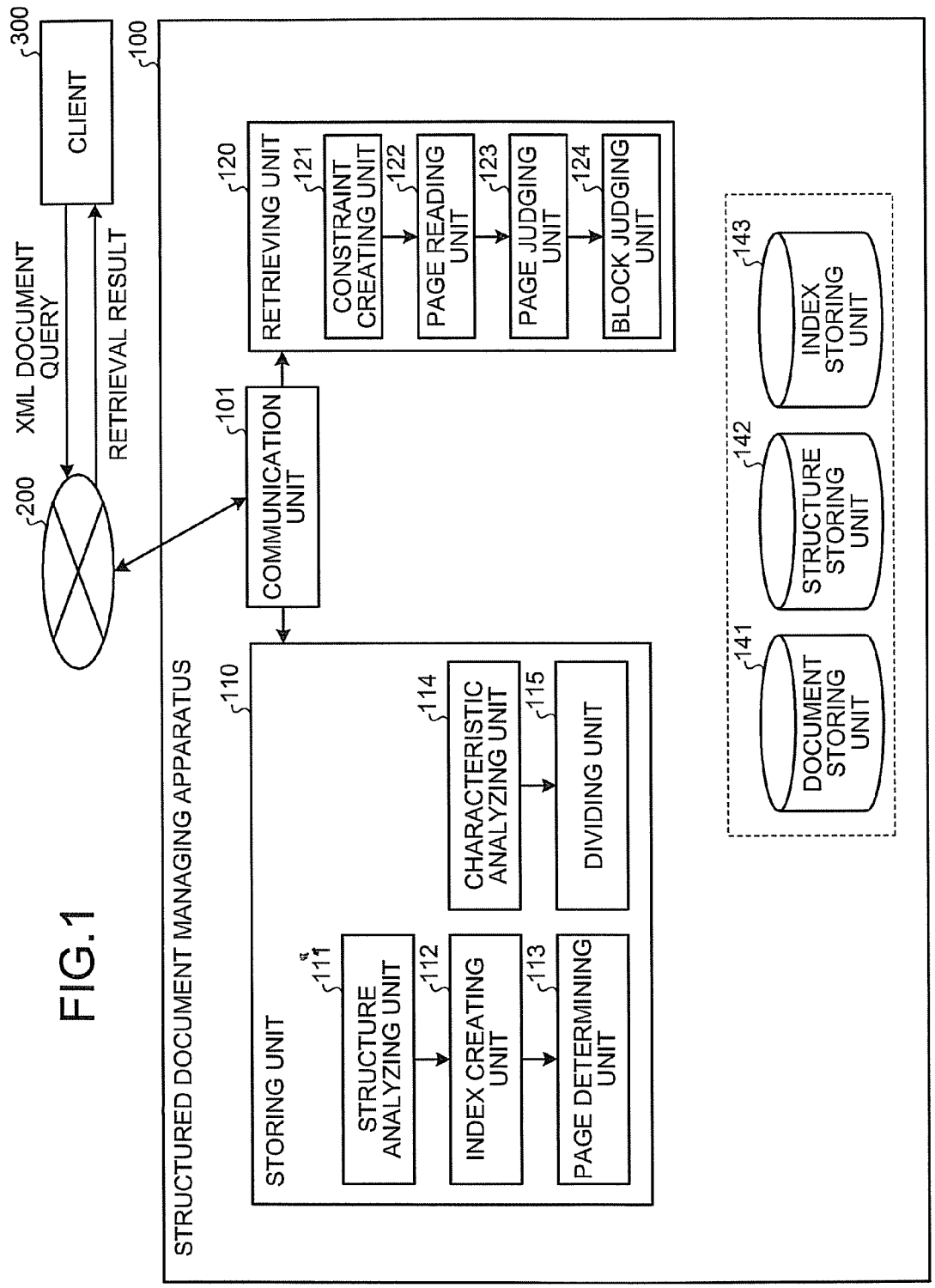

FIG.2

```
<PATENT ID="3">
  <TITLE>STRUCTURED DOCUMENT RETRIEVING APPARATUS</TITLE>
  <INVENTOR LIST>
    <INVENTOR ID="123">
      <FAMILY NAME>TANAKA</FAMILY NAME>
      <GIVEN NAME>ICHIRO</GIVEN NAME>
    </INVENTOR>
    <INVENTOR ID="456">
      <FAMILY NAME>SUZUKI</FAMILY NAME>
      <GIVEN NAME>JIRO</GIVEN NAME>
    </INVENTOR>
  </INVENTOR LIST>
  <EFFECT>SPEED OF RETRIEVAL OF STRUCTURED DOCUMENT
          ATTACHED WITH TAG IS INCREASED</EFFECT>
  <KEYWORD LIST>
    <KEYWORD>XML</KEYWORD>
    <KEYWORD>STRUCTURED DOCUMENT</KEYWORD>
    <KEYWORD>DATABASE</KEYWORD>
  </KEYWORD LIST>
</PATENT>
```

```
                              QUERY
for $x in/SET OF PATENTS/PATENT
where contains($x/TITLE, "STRUCTURED DOCUMENT")
     and$x[@ID="3"]
return <RETRIEVAL RESULT>{$x}</RETRIEVAL RESULT>
```

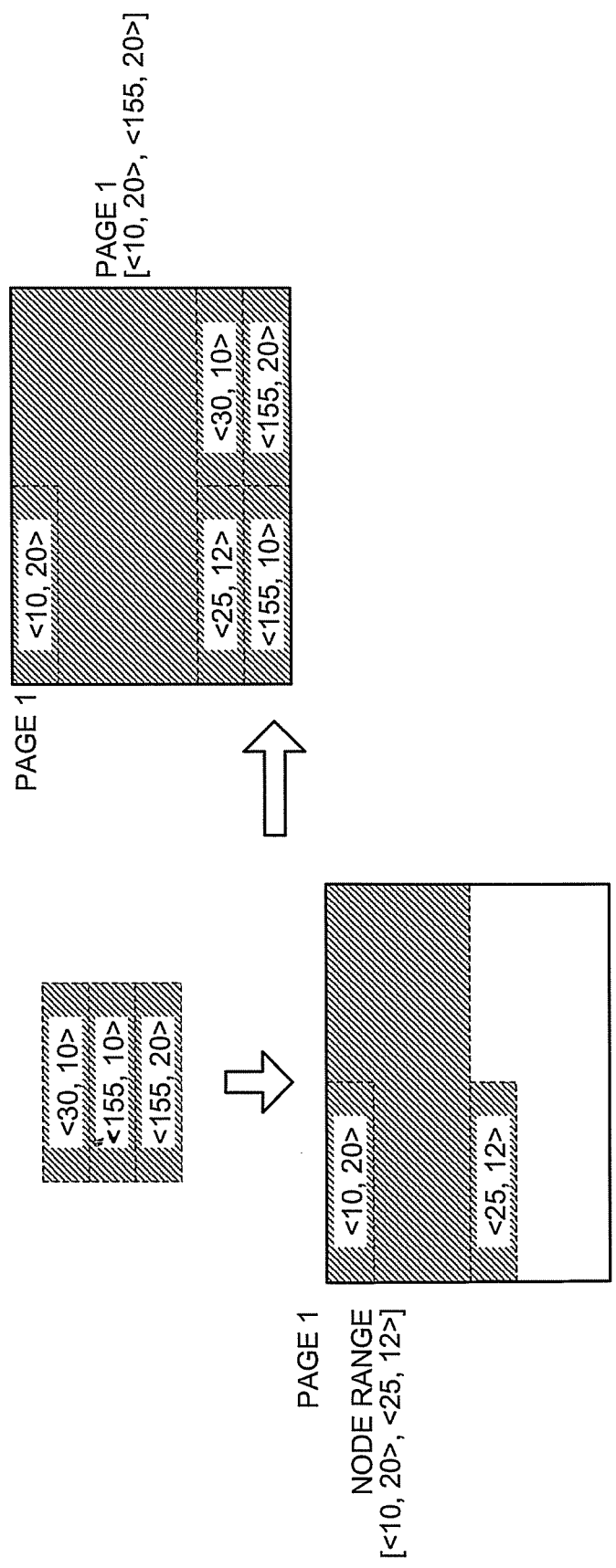

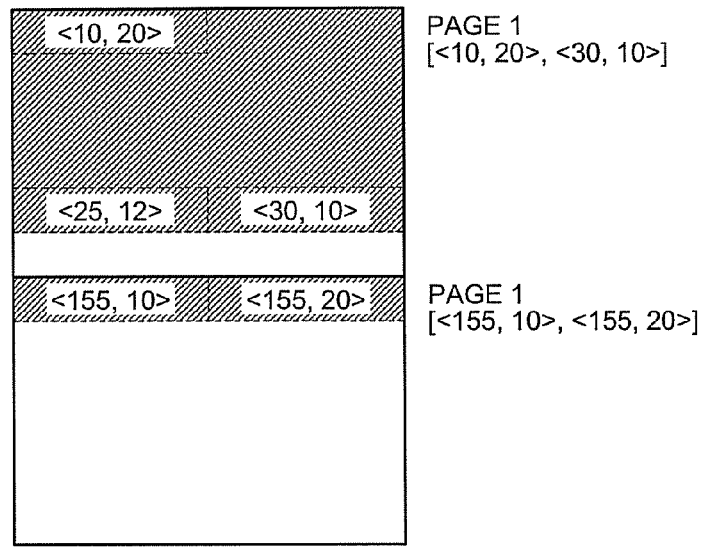

FIG.17

PAGE

PAGE HEADING INFORMATION
[<10, 20>, <90, 30>]  NODE RANGE INFORMATION

{5, 9, 10, 12, 15}  STRUCTURE SET

| <10, 20, 5> | <10, 30, 5> | <10, 30, 5> | <10, 40, 10> | <15, 10, 12> | <15, 20, 5> | <35, 10, 9> | <40, 10, 15> | <40, 20, 15> | <90, 10, 15> | <90, 20, 10> | <90, 30, 12> |

FIG.20

STRUCTURE      NUMBER OF
IDENTIFIER     APPEARANCES

| | |
|---|---|
| 5 | 4 |
| 15 | 3 |
| 10 | 2 |
| 12 | 2 |
| 9 | 1 |

FREQUENTLY APPEARING IDENTIFIERS (rows 5 and 15)

APPARATUS, METHOD, AND COMPUTER PROGRAM PRODUCT FOR MANAGING STRUCTURED DOCUMENTS

CROSS-REFERENCE TO RELATED APPLICATIONS

This application is based upon and claims the benefit of priority from the prior Japanese Patent Application No. 2007-079379, filed on Mar. 26, 2007; the entire contents of which are incorporated herein by reference.

BACKGROUND OF THE INVENTION

1. Field of the Invention

The present invention relates to an apparatus, a method, and a computer program product for managing a structured document by creating an index used for retrieval and retrieving data with the created index.

2. Description of the Related Art

In recent years, structured document databases for storing and retrieving structured document data described in eXtensible Markup Language (XML) and the like have been developed. In general, queries to the structured document databases are performed using a query language called XML Query (XQuery) that is currently under standardization by the World Wide Web Consortium (W3C).

In the XQuery, information at a node level in a document object model (DOM) such as elements and attributes is set as a retrieval object. For example, JP-A 2001-147933(KOKAI) proposes a technology described below for performing information retrieval at a node level in a structured document.

In a method disclosed in JP-A 2001-147933(KOKAI), first, in storing a structured document in a database, a data structure of the document to be stored is analyzed and analyzed information concerning the structure (node) is embedded in vocabulary index information or the like to create an index. The analysis information concerning the structure is information in which a path level that can be represented by XML Path Language (XPath) is regarded as identical structure information (structure template). A retrieval query is analyzed during retrieval to create a query graph and, after performing cost calculation, a plan for execution of a query is created. In creating the plan, the query is analyzed beforehand, constraints on the structure that respective variables should satisfy are calculated in advance, and a search range is limited in performing retrieval using the index to realize a reduction in the number of intermediate candidates.

In general, in a vocabulary index, a system for dividing a text to be registered into a plurality of vocabularies and managing index information in an inverted list format with the divided vocabularies set as units. This is a method that has been used in the field of full text retrieval. This method makes it possible to perform document retrieval by a keyword at high speed by recording document identifiers and occurrence position information as index information. In JP-A 2001-147933 (KOKAI), to extend this method to a structured document, element identifiers and structure information (structure identifiers) are added as index information.

Respective pages in the inverted list are often managed in block size units in which efficiency of disk I/O and the like is high. A plurality of pieces of index information are stored in the respective pages. To efficiently arrange the retrieval information, compression and the like of the retrieval information are performed.

A greatest advantage of the method of managing index information with an inverted list is speed in retrieval. In particular, from the viewpoint of disk I/O, a disk cache effect is expected by continuously arranging index information in a list format. Compared with a random arrangement of index information, high-speed page readout is possible. Therefore, compared with a system for managing index information in a tree format such as a B tree, retrieval performance is high, although update performance is inferior.

JP-A 2006-73035(KOKAI) proposes a technique for executing retrieval with an inverted list at high speed. As a characteristic of a method disclosed in JP-A 2006-73035 (KOKAI), a retrieval space is narrowed down by preferentially processing vocabularies with low frequencies using frequency information for each of vocabularies. As another characteristic of JP-A 2006-73035(KOKAI), during page arrangement, a range of document identifiers arranged in a page is recorded as a heading of the page, a document identifier to be retrieved and the range are compared during retrieval, and, when the document identifier is not included in the range, unnecessary retrieval for the page can be skipped.

However, in the method of recording a range of document identifiers in a vocabulary index as in JP-A 2006-73035(KOKAI), it is likely that values of document identifiers in a page fluctuate because fluctuation in document identifiers often occur for each of vocabularies. When a range of document identifiers in a page is excessively large, as a result, it is difficult to narrow down a retrieval space in page units and the effect of high speed fades away.

For example, assuming that the number of indexes present in a page is identical, a range of document identifiers of 10 to 100 and a range of document identifiers of 10 to 10000 are compared. In the former range, it is considered to be possible to skip unnecessary information collation in page units at a higher probability. On the other hand, because the latter range is large, it is highly likely that a document identifier to be retrieved is included in the range and the effect of high-speed retrieval by the skip of collation is not usually obtained.

When a structured document is an object of retrieval, it is necessary to take into account both structure information and vocabulary information. However, when a method not taking into account structure information as in JP-A 2006-73035 (KOKAI) is applied to creation of a vocabulary index of the structured document and retrieval by the vocabulary index, as a result, a solution space (page) for which retrieval is unnecessary is more often retrieved because of structural constraints.

For example, it is assumed that one thousand elements are present in a page and, among the elements, only ten pieces of index information concerning a specific structure "/title" are present. In this case, when the specific structure is designated and retrieved, if the structure information is not taken into account at all, the other nine-hundred ninety elements are also retrieved. Therefore, wasteful reading occurs.

SUMMARY OF THE INVENTION

According to one aspect of the present invention, a structured document managing apparatus includes an index storing unit that stores, in a page as a fixed-length storage area, a vocabulary index which associates vocabulary identifiers and specific information, the vocabulary identifiers identifying vocabularies included in a structured document having a layered logical structure, the specific information specifying positions where the vocabularies appear; a characteristic analyzing unit that analyzes a characteristic concerning a distribution of the specific information included in the vocabulary index stored in the page; and a dividing unit that divides the page into a plurality of blocks including one of a plurality of the vocabulary indexes based on the characteristic analyzed by the characteristic analyzing unit, calculates a first range representing a range of the specific information of the vocabulary indexes included in the blocks, and stores the first range in each of the divided blocks in the index storing unit.

According to another aspect of the present invention, a structured document managing method includes analyzing a characteristic concerning a distribution of specific information included in a vocabulary index in a page stored in an index storing unit that stores, in the page as a fixed-length storage area, the vocabulary index which associates vocabulary identifiers for identifying vocabularies included in a structured document having a layered logical structure and specific information for specifying positions where the vocabularies appear; dividing the page into a plurality of blocks including one of a plurality of the vocabulary indexes based on the analyzed characteristic; and calculating a first range representing a range of the specific information of the vocabulary indexes included in the blocks, and storing the first range in each of the divided blocks in the index storing unit.

A computer program product according to still another aspect of the present invention causes a computer to perform the method according to the present invention.

BRIEF DESCRIPTION OF THE DRAWINGS

FIG. 1 is a block diagram of a structured document management system according to an embodiment of the present invention;

FIG. 2 is a diagram for illustrating an example of a structured document described in XML;

FIG. 12 is a diagram for explaining an example of page determination processing by a method in the past;

FIG. 13 is a diagram for explaining an example of page determination processing according to the embodiment;

FIG. 14 is a diagram for illustrating an example in which document identifiers are allocated in order from one with a smallest idle number;

FIG. 15 is a diagram for illustrating an example in which an idle number with which a node range is minimized is selected and allocated as a document identifier;

FIG. 17 is a diagram for illustrating an example of a page of an inverted list;

FIG. 20 is a diagram for illustrating an example in which a distribution of structure elements is created;

DETAILED DESCRIPTION OF THE INVENTION

Figure 3:
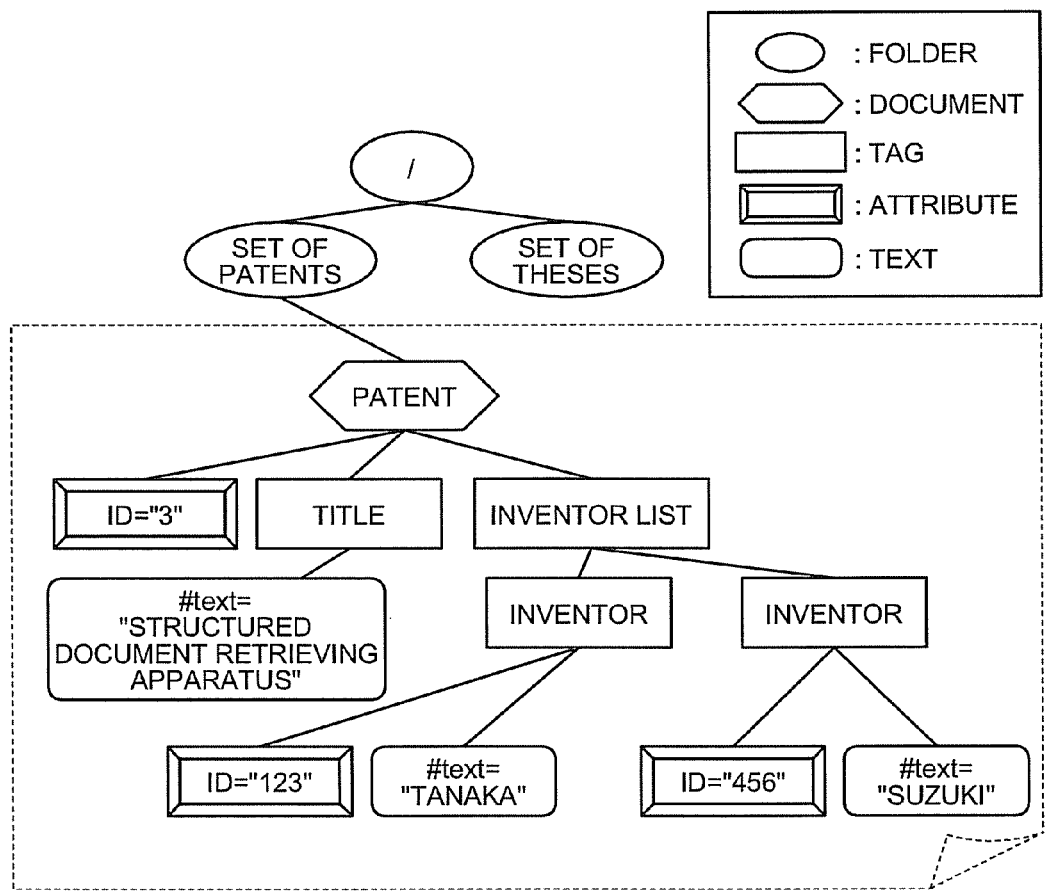
FIG. 3 is a diagram for illustrating an example of a data structure of a structured document stored in a document storing unit.

Exemplary embodiments of the present invention are explained in detail below with reference to the accompanying drawings.

A structured document managing apparatus according to an embodiment of the invention divides respective pages of an inverted list into a plurality of blocks taking into account a characteristic concerning a distribution of document identifiers and the like, and creates a vocabulary index in which ranges of the document identifiers and the like included in the respective blocks are associated with one another. The structured document managing apparatus prevents access to an unnecessary block referring to the ranges to allow a user to perform retrieval at high speed.

The structured document managing apparatus controls, when the created vocabulary index is registered in pages of an inverted list, ranges of document identifiers and the like of a document stored in the respective pages not to be excessively large.

As shown in FIG. 1, in a structured document managing system according to this embodiment, a client 300 and a structured document managing apparatus 100 are connected via a network 200.

The client 300 transmits a structured document (an XML document) to be registered and a retrieval condition (a query) for retrieving a registered structured document to the structured document managing apparatus 100 and receives a retrieval result.

The network 200 connects the client 300 and the structured document managing apparatus 100. For example, any network form such as the Internet, a wire LAN (Local Area Network), or a wireless LAN can be applied as the network 200.

The structured document managing apparatus 100 performs registration of a structured document, creation of an index, retrieval of the structured document, and the like according to a request from the client 300. The structured document managing apparatus 100 includes a communication unit 101, a document storing unit 141, a structure storing unit 142, an index storing unit 143, a storing unit 110, and a retrieving unit 120.

The communication unit 101 receives requests for various kinds of processing and a structured document to be registered from the client 300 via the network 200 and transmits a retrieval result to the client 300.

Commands received from the client 300 include a storage command and a retrieval command. The storage command is a command for requesting execution of processing for storing an input structured document. The retrieval command is a command for acquiring a result set with a query language (XQuery, etc.) as an input. The result set is a set of document identifiers and element identifiers as a retrieval result.

The storage command and the retrieval command received by the communication unit 101 are notified to the storing unit 110 and the retrieving unit 120, respectively.

The document storing unit 141 is a storing unit that stores a structured document described in XML. A description format of the structured document is explained.

In FIG. 2, an example of a structured document in which information concerning a patent is described in an XML format is shown. In the XML, tags are used for representation of the structure of a document. The tags include a start tag and an end tag. By placing a structure element of the structure document between the start tag and the end tag, it is possible to clearly describe a delimiter of a character string (a text) in the document and describe to which structure element in the structure the text belongs.

In the XML, a unit of data defined by using the tags is called an element. For example, data including a <patent> tag and a </patent> tag and placed between both the tags forms one element.

An attribute for adding additional information indicating whether it is possible to omit the element or repeat the element can be designated for the element. The attribute is set in a format such as "<element name attribute="attribute value">" in the start tag.

The start tag is described in a format in which an element name is closed by marks "<" and ">". The end tag is described in a format in which an element name is closed by marks "</" and ">". Between the start tag and the end tag, a text representing actual information of the structured document or another element (a child element) is set. A structure element not including a text such as "<patent DB></patent DB>" can also be represented as "<patent DB/>" as a simple notation.

The document shown in the figure has an element starting with the "patent" tag as a document root and has elements starting with "title", "inventor list", "effect", and "keyword" tags as child elements of the document root. For example, as the element starting with the "title" tag, one text (character string) such as "structured document retrieving apparatus" is present.

Information obtained by extracting names of the respective tags and a hierarchical relation among the tags, the number of repetitions, and the like from such a structured document of the XML format is referred to as structure information. A logical unit of the structure forming the structure information of the structured document is referred to as a structure element. In this embodiment, the element, the attribute, and the text described above are structure elements.

A data structure of a structured document stored in the document storing unit 141 is explained.

FIG. 3 depicts an example in which the structured document shown in FIG. 2 is represented by a data structure of a tree structure. In FIG. 3, an elliptical node means a node representing a folder, a hexagonal node means a node representing a document, a single line square means a node representing a tag, a double line square means a node representing an attribute, and a rounded square means a node representing a text.

For example, subtrees below a node representing an "inventor list" tag represents that two "inventor" elements are included below the "inventor list" element. The document storing unit 141 stores such a data structure of the tree structure in a table format. However, the data structure in the table format is not shown in the figure.

Referring back to FIG. 1, the structure storing unit 142 stores structure information extracted from the structured document of the XML format described above. The structure storing unit 142 is referred to when the structure of the structured document stored in the document storing unit 141 is collated with structure information and analyzed.

Figure 4:
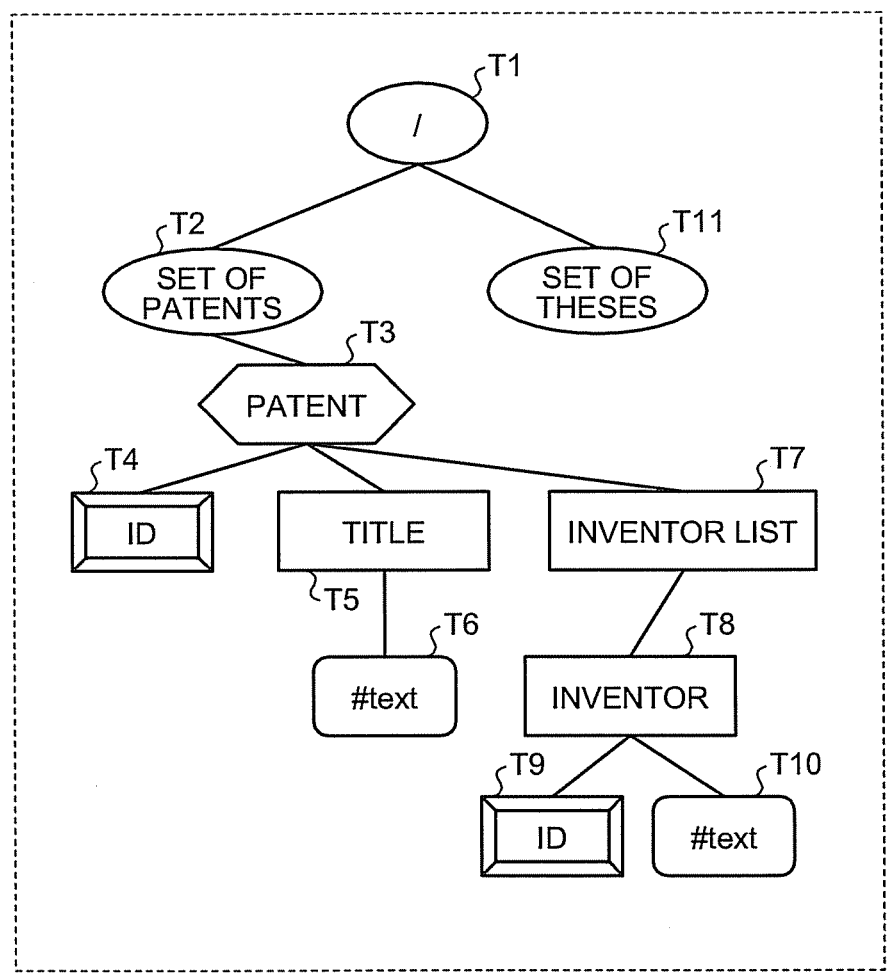
FIG. 4 is a diagram for illustrating an example of a data structure of structure information stored in a structure storing unit.

An example in which structure information is represented by a tree structure is shown in FIG. 4.

As shown in the figure, like the tree structure of the structured document, the tree structure of the structure information includes an elliptical node representing a folder, a hexagonal node representing a document, a single line square node representing a tag, a double line square node representing an attribute, and a rounded square node representing a text.

A structure identifier (TID) as an identifier for uniquely identifying structure elements, which are the respective nodes of the structure information, is given to the structure information. The structure information is information obtained by extracting only information representing structures from a plurality of structured documents. Therefore, for example, even if a plurality of pieces of information such as nodes of an "inventor" tag can be set in the structured document, the pieces of information are consolidated into one in the structure information.

The structure storing unit 142 stores such structure information of the tree structure in a table format. However, the structure information in the table format is not shown in the figure.

Referring back to FIG. 1, the index storing unit 143 stores a vocabulary index in which vocabulary identifiers for identifying vocabularies included in all structured documents stored in the document storing unit 141 and specific information for specifying the structured documents including the vocabularies and positions in the document are associated with one another.

Figure 5:
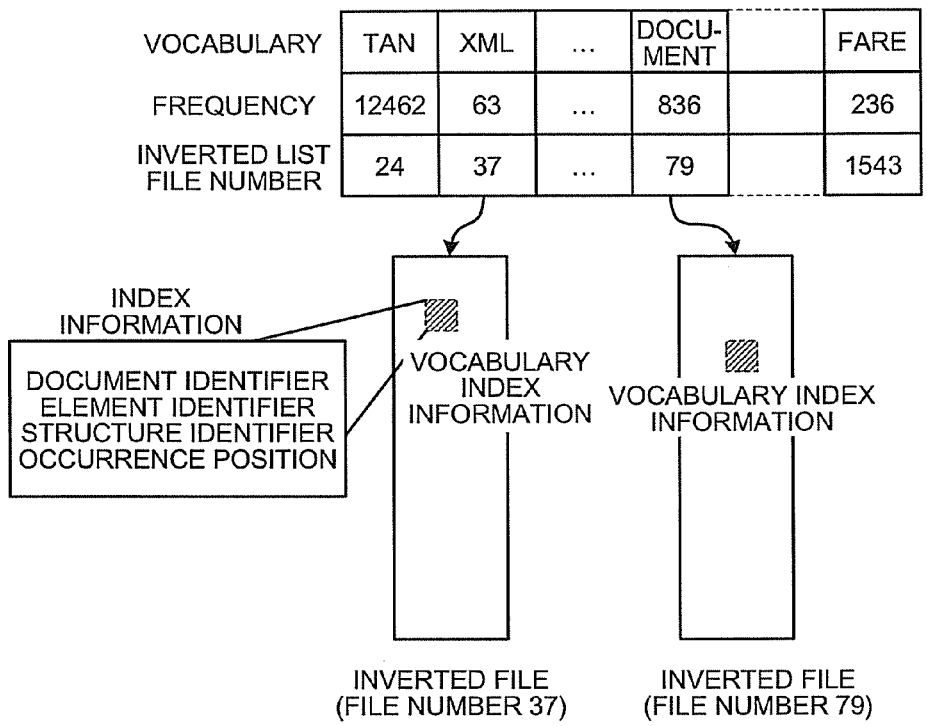
FIG. 5 is a diagram for illustrating an example of a data structure of a vocabulary index stored in an index storing unit.

As shown in FIG. 5, the index storing unit 143 stores an vocabulary index in which vocabulary identifiers as identifiers for vocabularies given in ascending order of occurrence of the respective vocabularies, occurrence frequencies of the vocabularies in all the structured documents, and inverted list file numbers are associated with one another. The inverted list file numbers are numbers for uniquely identifying inverted list files including information concerning elements including the vocabularies corresponding to the vocabulary identifiers.

In a lower part of the figure, an example of a data structure of an inverted list file (hereinafter simply referred to as "inverted list") is shown. The inverted list stores document identifiers for identifying structured documents, element identifiers for identifying respective elements in the structured documents, structure identifiers, and occurrence positions in association with one another. In this embodiment, as specific information for specifying the structured documents including vocabularies corresponding thereto and positions in the documents, the document identifiers, the element identifiers, the structure identifiers, and the occurrence positions are stored in the inverted list.

The occurrence positions are information representing positions where vocabularies corresponding to the inverted list appear in the elements of the structured documents identified by the document identifiers and the element identifiers. With the vocabulary index including such an inverted list, elements corresponding to the respective vocabularies can be specified.

The occurrence frequencies are often used as statistical information for efficiently performing narrow-down retrieval in a general method of full text retrieval. For example, in retrieval employing an N-gram, vocabularies are retrieved in order from one with a lowest occurrence frequency and positions of the vocabularies are collated. In this way, unnecessary processing is skipped.

Figure 6:
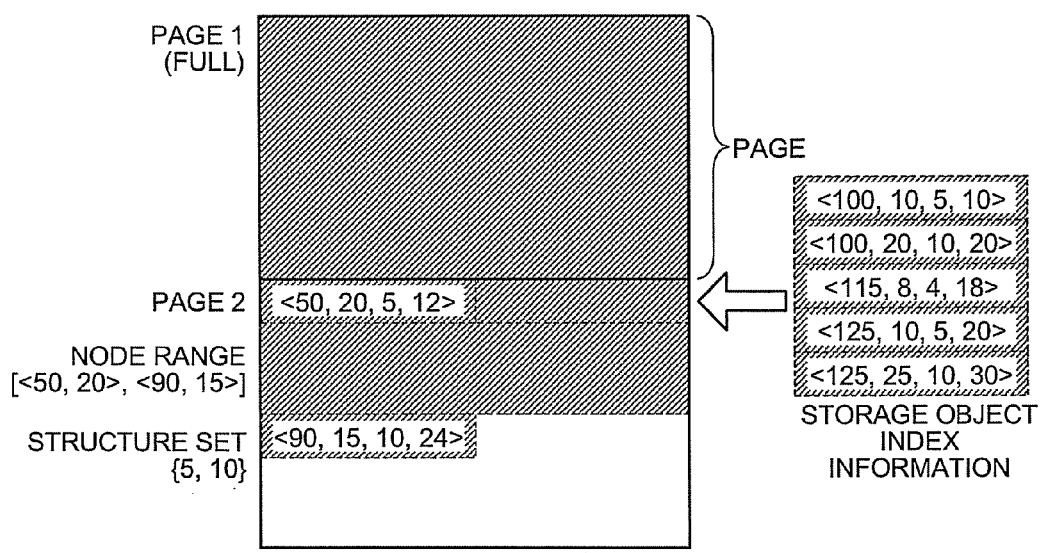
FIG. 6 is a diagram for illustrating an example of a detailed structure of an inverted list.

The detailed structure of the inverted list is further explained. As shown in FIG. 6, the inverted list includes a plurality of pages. A plurality of pieces of index information are stored in the respective pages. The index information can be compressed and stored.

A page size is often decided based on a fixed-length size with which disk I/O can be efficiently performed. A plurality of (e.g., one-thousand) index elements are stored in a page. In FIG. 6, an example of an inverted list including a page 1 in which index elements are stored in all areas and a page 2 in which a space area is present is shown.

In this embodiment, as heading information of the respective pages, at least range information (node range) of document identifiers and element identifiers and appearance patterns (structure sets) of structure identifiers are stored. During retrieval, a page clearly including only unnecessary information is skipped by referring to the header information of the pages.

The node range is represented in a form of [<a1,b1>, <a2,b2>]. This represents that a range of document identifiers is a1 to a2 and a range of element identifiers is b1 to b2. The structure set is represented in a form of listing appearing structure identifiers in a mark { }. For example, in FIG. 6, an example in which a node range for the page 2 is [<50,20>, <90,15>] and the structure set is {5,10} is shown.

In FIG. 6, five kinds of index information (storage object index information) shown on the right side in the figure are stored in such an inverted list. Such index information is created by an index creating unit 112 described later. The index information is described in a form of <document identifier, element identifier, structure identifier, occurrence position>.

Figures 7, 8:
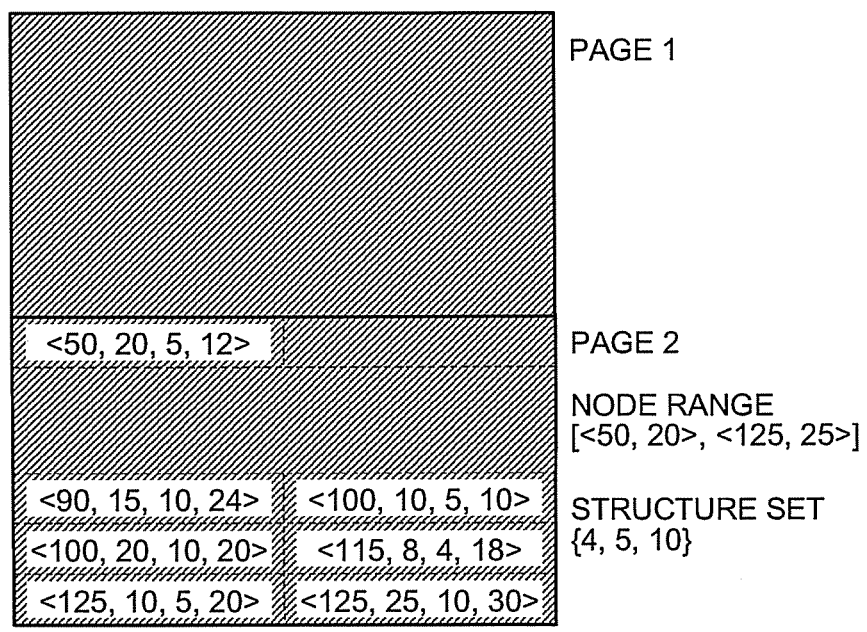
FIG. 7 is a diagram for illustrating an example of a detailed structure of an inverted list.
FIG. 8 is a diagram for illustrating an example of an input query.

FIG. 7 depicts an example of an inverted list after the five kinds of index information shown on the right side in FIG. 6 are added to the inverted list shown on the left side in FIG. 6.

In this example, because the end of the page 2 is a storage position, five index candidates are stored in this position. It is assumed that the node range [<50,20>, <90,15>] and the structure set {5,10} are already stored as heading information.

The heading information in the page is updated at timing when index information is added. In this example, the node range is updated to [<50,20>, <125,25>] and the structure set is updated to {4,5,10}. By appropriately updating the heading information simultaneously with registration of index information in this way, it is possible to judge presence of a solution in page units simply by referring to the heading information. It is possible to perform high-speed retrieval by collectively skipping pages in which it can be judged that no solution is present.

For example, combination processing for collating position information necessary for retrieval of an N-gram and the like is performed. It is assumed that candidates of the document identifier 125 and the element identifier 50 in the page 2 are index elements to be combined. In this case, according to a method of not referring to the heading information, scan and collation processing are necessary for the respective candidates in the page 2. On the other hand, according to a method of referring to the heading information, it can be judged, only with the heading information, that the candidates of the document identifier 125 and the element identifier 50 are not included in the node range [<50,20>, <125,25>]. Search through the page 2 can be skipped.

Paying attention to a condition of a structure identifier, for example, when the combination processing with candidates having a structure identifier 8 is performed, the structure set {5,10} of the heading information is referred to. Because the structure identifier 8 is not present in the structure set, it can be judged that search through the page 2 is unnecessary.

In this way, unnecessary retrieval in a page is reduced by storing, as heading information of the page, range information of document identifiers and element identifiers and information on values that structure identifiers can take and using these kinds of information in a complex manner. However, in a method of storing index information by simply adding the index information in a page in which a space area is present, it is highly likely that accuracy of these kinds of information in the page is low. Thus, in this embodiment, arrangement positions of the index information are controlled at a stage when a page in which the index information is stored is determined. This processing is executed by a page determining unit 113 as described later.

The document storing unit 141, the structure storing unit 142, and the index storing unit 143 can be any storage media generally used such as a hard disk (HD), an optical disk, a memory card, and a random access memory (RAM).

Referring back to FIG. 1, the storing unit 110 registers a structured document in the document storing unit 141, analyzes the structured document to be registered, creates the structure concerning retrieval, index information of vocabularies, and the like, and stores the structure, the index information, and the like in the structure storing unit 142 and the index storing unit 113. The storing unit 110 includes a structure analyzing unit 111, the index creating unit 112, the page determining unit 113, a characteristic analyzing unit 114, and a dividing unit 115.

The structure analyzing unit 111 performs processing for parsing a structured document in a text format received from the communication unit 101 and expanding the structured document into an object tree format such as a DOM. Expanded respective objects are attached with object identifiers for uniquely identifying the objects and stored in the document storing unit 141. The document identifier and the element identifier are equivalent to the object identifier.

The structure analyzing unit 111 scans an object tree, extracts characteristic structure information for an object document, and manages the structure information in the structure storing unit 142 in a tree format. Such structure information can also be referred to as a structure template. This embodiment is on the premise that, with a method same as that in the past, schema information for a structured document is appropriately extracted using statistical information and the like and the structure template is updated according to the schema information.

The index creating unit 112 subjects, for each of elements of an analyzed structured document, a text portion to vocabulary division and creates index information. The index creating unit 112 applies a division method employing an N-gram as a method of dividing vocabularies. The method of dividing vocabularies is not limited to the method by the N-gram. Any method used in the past such as a method employing morphological analysis can be applied.

The page determining unit 113 determines a page in which the index information created by the index creating unit 112 is registered. Specifically, first, the page determining unit 113 calculates, for respective pages in which space areas are present, a page storage ratio representing a ratio of areas in which data is stored and judges whether the page storage ratio exceeds a predetermined threshold value, for example, 80%. When the page storage ratio exceeds the threshold value, the page determining unit 113 calculates, referring to the document identifiers of the created index information, a node range of heading information of the page in which the index information is registered. The page determining unit 113 calculates an increase ratio of the calculated node range. When the increase ratio exceeds a predetermined threshold value, the page determining unit 113 determines that the index information is stored in a page created anew rather than the pages in which space areas are present.

When the page storage ratio does not exceed the predetermined threshold value (e.g., 80%), the page determining unit 113 determines that the index information is stored in the page. When the page storage ratio is small, if a new page is further created, because storage efficiency of the index information is deteriorated, it is necessary to prevent the deterioration in the storage efficiency. When the increase ratio does not exceed the predetermined threshold value, the page determining unit 113 also determines that the index information is stored in the page.

The increase ratio is calculated as (a range of the document identifier after registration−a range of the document identifier before registration)×100/(the range of the document identifier before registration). The page determining unit 113 can determine whether the index information is stored in the new page according to whether an absolute value of the range of the document identifier after registration exceeds a predetermined threshold value. The page determining unit 113 can determine a page according to any one of an increase ratio of the element identifier and an increase ratio of the structure identifier or both.

The characteristic analyzing unit 114 analyzes, for vocabulary indexes (index information) of the respective pages stored in the index storing unit 143, characteristics concerning distributions of document identifiers, element identifiers, and structure identifiers. For example, the characteristic analyzing unit 114 calculates a difference between values of any one of document identifiers and element identifiers or both between two vocabulary indexes stored adjacent to each other in the respective pages.

The characteristic analyzing unit 114 calculates, as a characteristic concerning a distribution of the structure identifiers, appearance frequencies in the structured document of structure elements corresponding to the structure identifiers or distances (the numbers of layers) on a tree among the structure elements corresponding to the respective structure identifiers.

The dividing unit 115 divides, referring to the characteristics analyzed by the characteristic analyzing unit 114, the respective pages into blocks as units including one or a plurality of vocabulary indexes. The dividing unit 115 calculates, for each of the divided blocks, a first range representing a range of specific information of vocabulary indexes included in the block and stores the calculated first range in the index storing unit 143 as heading information for the block.

For example, the dividing unit 115 divides, referring to a difference between document identifiers analyzed as a characteristic, a page into blocks at a boundary between two vocabulary indexes in which the difference exceeds a predetermined threshold value. When the difference between the document identifiers is 0, the dividing unit 115 divides, referring to a difference between element identifiers, the page into blocks when the difference between the element identifiers exceeds the predetermined threshold value.

When appearance frequencies are obtained as a characteristic concerning the distribution of the structure identifiers, the dividing unit 115 further calculates ranks of the appearance frequencies and groups adjacent vocabulary indexes having close ranks to thereby divide a page into blocks. Moreover, when the numbers of layers are obtained as the characteristic concerning the distribution of the structure identifiers, the dividing unit 115 divides the page into blocks at a boundary between two vocabulary indexes in which the numbers of layers exceed a predetermined threshold value.

The dividing unit 115 can divide the page into blocks according to one pattern referring to any one of the characteristics described above or can divide the page into blocks according to a plurality of patterns with the methods described above corresponding to the respective characteristics referring to all the characteristics. In other words, the methods of dividing the page into blocks are not alternative. A plurality of arbitrary methods can be applied in combination.

When the page is divided into blocks with the document identifiers and the element identifiers, the dividing unit 115 store a range of the document identifiers and the element identifiers (a intra-page node range) for each of the blocks as heading information of the block. When the page is divided into blocks with the structure identifiers, the dividing unit 115 stores a set of the structure identifiers (an intra-page structure set) for each of the blocks as heading information of the block.

The retrieving unit 120 executes retrieval processing on an input retrieval condition according to a retrieval command received from the client 300 and creates a result set. The retrieving unit 120 includes a constraint creating unit 121, a page reading unit 122, a page judging unit 123, and a block judging unit 124.

As a premise of the retrieval condition input to the retrieving unit 120, the retrieval condition is described in a query language for a structured document such as XQuery. In the same manner as the method disclosed in JP-A 2001-147933 (KOKAI), the retrieving unit 120 creates a query graph in which a retrieval condition is represented in a tree structure from an internal form obtained by analyzing the retrieval condition and creates, for embodiment of all variables included in the query graph, data representing combinations of values (candidates sets), which a variable set called a table can take, one after another to thereby calculate a retrieval result. Unit processing for creating one table is called an operator and results of respective operators are stored in a candidate storing unit (not shown) as a candidate set.

Figure 9:
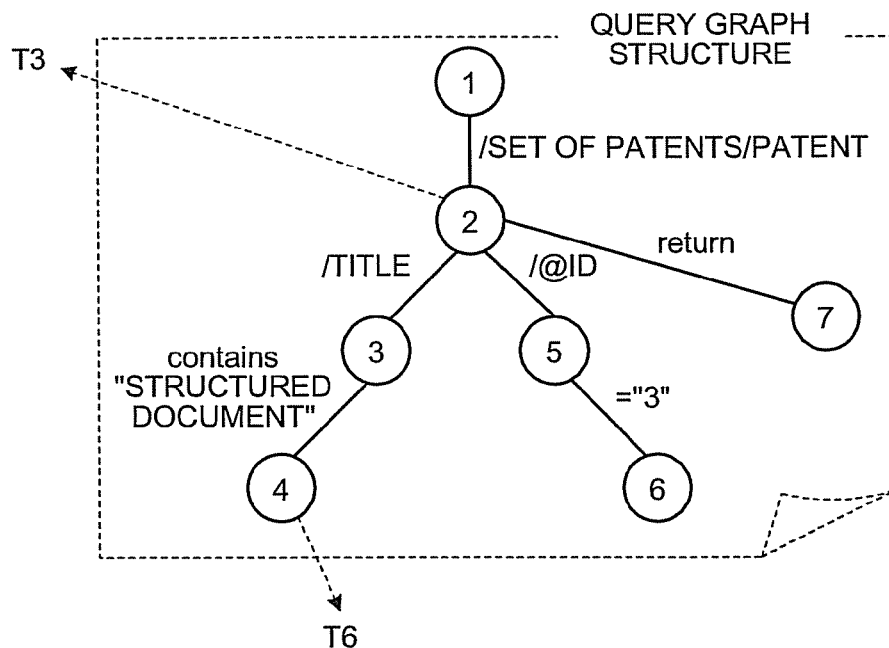
FIG. 9 is a diagram for illustrating an example of a query graph.

The constraint creating unit 121 parses the input retrieval condition (query) and creates a query graph as an analysis result. In creating a query graph, constraints for the structure that respective nodes should satisfy are attached. FIG. 8 is a diagram for explaining an example of an input query. FIG. 9 is a diagram for illustrating an example of a query graph obtained by analyzing the query in FIG. 8.

In the example shown in FIG. 8, a retrieval condition indicating that "a patent document including "structured document" in a text of a subordinate title object is acquired and retrieval result data placed between "<retrieval result>" tags is output" is input as a query.

As shown in FIG. 9, a query graph obtained by analyzing the query shown in FIG. 8 is represented by a tree structure including nodes corresponding to respective structure elements of structure information. For example, a node 2 of the query graph in FIG. 9 indicates that a patent tag (TID=T3) in FIG. 4 corresponds thereto. For example, a node 3 indicates that a title tag corresponds thereto and a node 4 indicates that a text element below the title tag corresponds thereto.

Structure constraints concerning the structure that the nodes have to satisfy one another are attached to the respective nodes of the query graph. For example, a constraint that the node 4 of the query graph has to be the text element below the title tag is attached to the node 4 as a structure constraint. In this case, a structure element TID=T6 is acquired for the node 4 as a candidate of a structure element corresponding thereto. Similarly, a structure element TID=T3 is acquired for the node 2 as a candidate. When a vocabulary index is scanned, because only vocabularies satisfying constraints have to be scanned, it is possible to narrow down a retrieval space beforehand.

When there are retrieval conditions (hereinafter, "retrieval keys") for structure elements, i.e., value constraints concerning values of texts included in the structure elements are present, the retrieval keys are associated with nodes corresponding to structure elements that are retrieval objects of the retrieval keys. For example, "contains "structured document"" is associated with the text element below the title tag corresponding to the node 4 as a retrieval key.

In this way, the constraint creating unit 121 collates the retrieval conditions and global structure information (TID) of the structured document and creates a query graph referring to the structure storing unit 142 to thereby execute processing for narrowing down a retrieval space. By narrowing down the retrieval space, unnecessary information can be skipped when index information is scanned. It is expected that retrieval processing is executed at high speed.

The page reading unit 122 reads a page to be scanned (an object page) when a vocabulary index is scanned.

The page judging unit 123 judges, referring to heading information of the object page read by the page reading unit 122, whether it is likely that solution candidates are present in the object page. Specifically, the page judging unit 123 judges, referring to a node range of the heading information, whether document identifiers and element identifiers of the vocabulary index as solution candidates are included in the node range. The page judging unit 123 judges, referring to a structure set of the heading information, whether structure identifiers of the vocabulary index as solution candidates are included in the structure set.

When it is judged that solution candidates are not present in the object page, the processing for the object page is discontinued and the retrieving unit 120 controls the retrieval processing to repeat the processing from reading of the next page. When it is judged that solution candidates are present in the object page, blocks to be searched through in the page are judged by the block judging unit 124 described later.

The block judging unit 124 judges, referring to heading information for the respective blocks in the object page, in which of the blocks in the object page solution candidates are present. Specifically, the block judging unit 124 judges, referring to the intra-page node range, whether document identifiers and element identifiers of the vocabulary index as solution candidates are included in the intra-page node range. The block judging unit 124 judges, referring to the intra-page structure set, whether structure identifiers of the vocabulary index as solution candidates are included in the intra-page structure set.

When both the intra-page node range and the intra-page structure set are stored, a common portion of blocks judged as including solution candidates using heading information of the intra-page node range and the intra-page structure set is obtained as a retrieval space.

Figure 10:
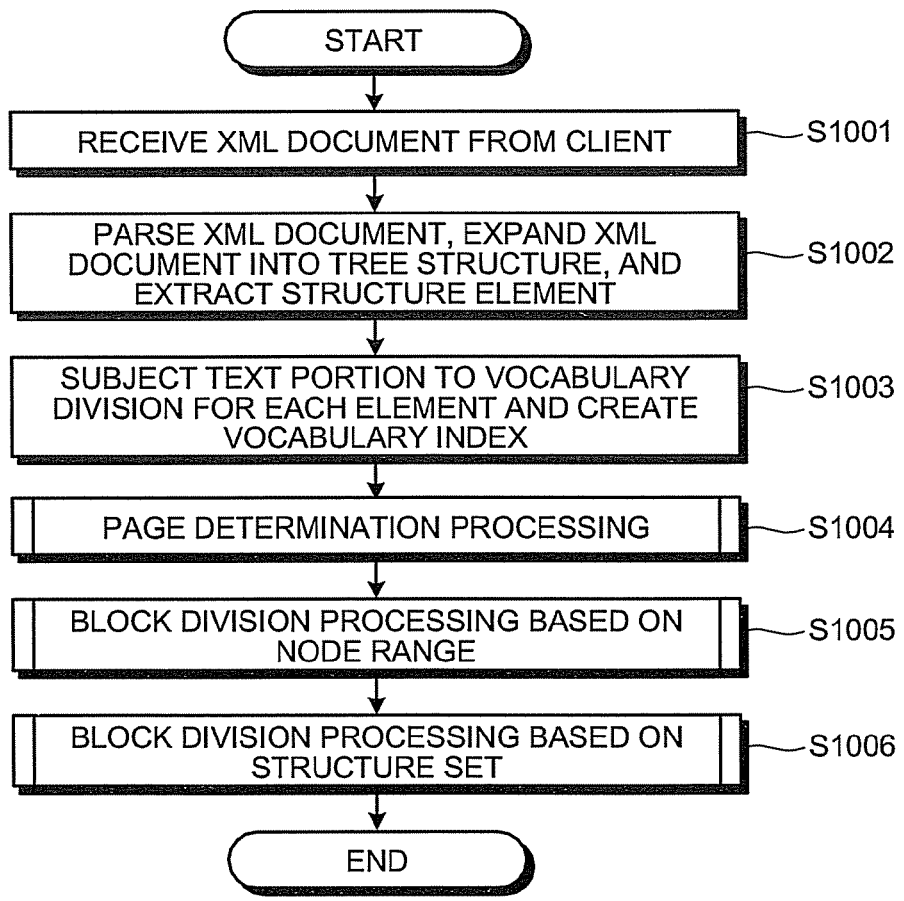
FIG. 10 is a flowchart of an overall flow of index creation processing according to the embodiment.

Index creation processing by the structured document managing apparatus 100 according to this embodiment constituted as described above is explained with reference to FIG. 10. In this embodiment, the index creation processing refers to processing for analyzing a structured document requested to be registered to create a vocabulary index, storing the vocabulary index in an appropriate page of an inverted list, and dividing the respective pages in appropriate block units. Processing for registering the structured document, which is requested to be registered, in the document storing unit 141 is the same as the processing in the past. Thus, explanation of the processing is omitted.

First, the communication unit 101 receives an XML document to be registered from the client 300 (step S1001). The structure analyzing unit 111 parses the received XML document, expands the XML document into a tree structure, and extracts structure elements (step S1002).

The index creating unit 112 subjects, for respective elements of the XML document corresponding to the extracted structure elements, a text portion to vocabulary division to create a vocabulary index (step S1003). The index creating unit 112 uses a method of dividing the text portion with an N-gram as described above as a method of vocabulary division.

The structured document managing apparatus 100 executes page determination processing for determining a page in which a range of heading information of the page is not excessively large as a page in which the created vocabulary index is stored (step S1004). Details of the page determination processing are described later. A main purpose of the page determination processing is to remove candidates that clearly hinder the effect of page skip. Control concerning a fine distribution in page units is performed in two kinds of block division processing described below.

The structured document managing apparatus 100 executes processing for dividing the page in which the vocabulary index is stored into blocks referring to heading information of the page. First, the structured document managing apparatus 100 executes block division processing based on a node range of the heading information (step S1005). The block division processing based on a node range is processing for dividing respective pages into mode detailed block units taking into account distributions of document identifiers and element identifiers and giving heading information same as heading information of each of the pages to the divided blocks. This makes it possible to further narrow down a search range in block units referring to the heading information for each of the blocks in the same manner as narrowing down the pages referring to the heading information.

Next, the structured document managing apparatus 100 executes block division processing based on a structure set of the heading information (step S1006). The block division processing based on a structure set is processing for further dividing the respective pages into more detailed block units taking into account a distribution of structure identifiers and giving heading information same as the heading information for each of the pages to the divided blocks.

Details of the block division processing based on a node range and the block division processing based on a structure set are described later. Execution order of these two kinds of block division processing is not limited to the order described above. The block division processing based on a structure set can be executed earlier or both the kinds of block division processing can be executed in parallel. At least one of the two kinds of block division processing can be executed.

The processing for dividing a page into blocks does not have to be performed every time a vocabulary index is registered. The processing can be performed at timing when the number of pieces of index information reaches a maximum number in the page. This makes it possible to reduce calculation cost.

Figure 11:
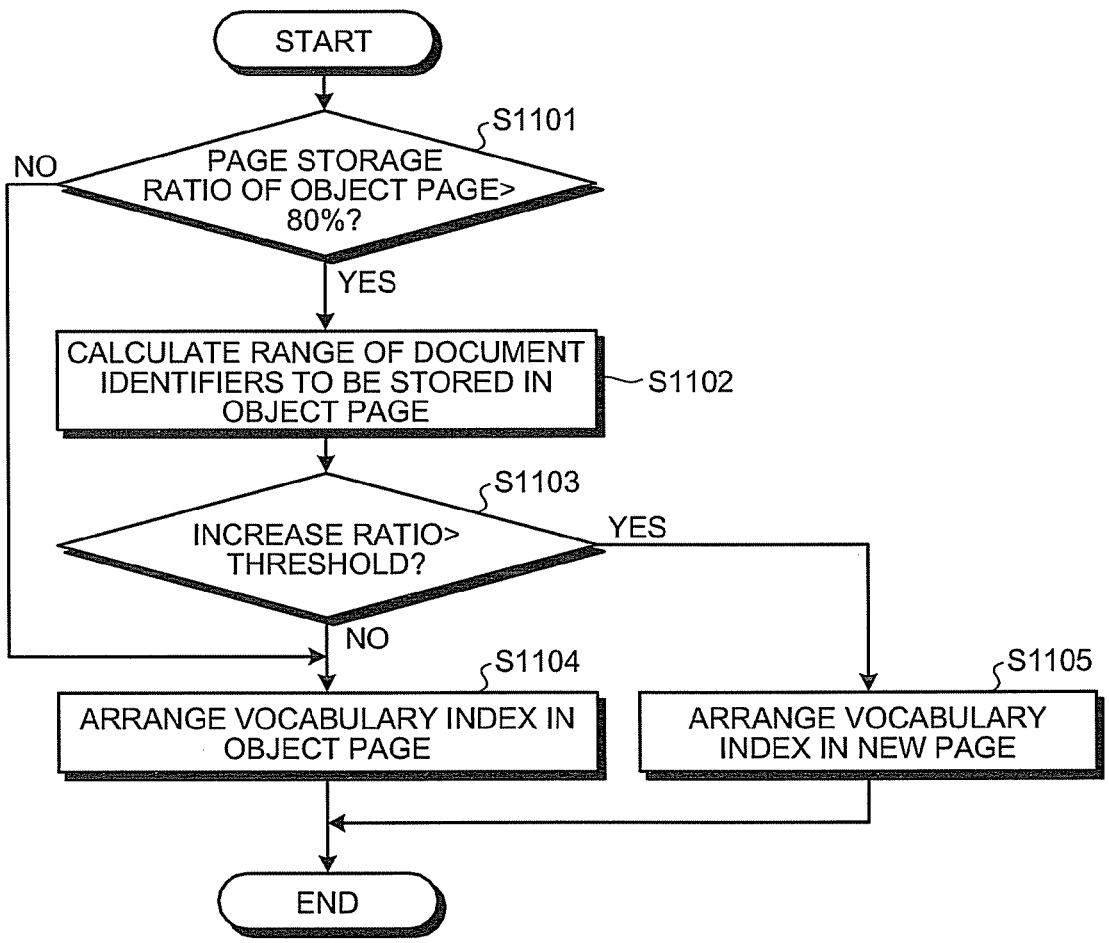
FIG. 11 is a flowchart of an overall flow of page determination processing.

Details of the page determination processing at step S1004 are explained with reference to FIG. 11.

After the vocabulary index is created at step S1003, the page determining unit 113 judges whether a page storage ratio of an object page, which can be a registration destination of the created vocabulary index, has exceeded the predetermined threshold value of 80% (step S1101). When the page storage ratio has exceeded the predetermined threshold value ("YES" at step S1101), the page determining unit 113 calculates a range of document identifiers to be stored in the object page (step S1102). For example, when it is assumed that the five kinds of storage object index information on the right side in FIG. 6 are stored in the page 2 in the figure, whereas a range of document identifiers is 41 (=90−50+1) before registration, the range increases to 76 (=125−50+1) after registration.

The page determining unit 113 calculates an increase ratio of the calculated range and judges whether the increase ratio has exceeded a predetermined threshold value (e.g., 30%) (step S1103). In the example described above, it is judged that the increase ratio has exceeded the threshold value because the increase ratio is 85% (=(76−41)×100/41).

When the increase ratio has not exceeded the threshold value ("NO" at step S1103), the page determining unit 113 determines that the vocabulary index is arranged in the object page (step S1104). When the increase ratio has exceeded the threshold value ("YES" at step S1103), the page determining unit 113 determines that a page is created anew instead of the object page and the vocabulary index is arranged in the created new page (step S1105).

When it is judged in step S1101 that the page storage ratio has not exceeded the predetermined threshold value ("NO" at step S1101), the page determining unit 113 determines that the vocabulary index is arranged in the object page (step S1104).

According to such processing, it is possible to suppress creation of a new page when the page storage ratio is low and improve storage efficiency of indexes of the entire inverted list. It is possible to further judge an increase ratio of the range of the document identifiers used as heading information when the page storage ratio is high and store the vocabulary index in the new page when the increase ratio is high to thereby prevent the range of the document identifiers from becoming excessively large.

A specific example of such page determination processing is explained. First, for comparison, a specific example of page determination processing by the method in the past is explained with reference to FIG. 12.

In the example shown in FIG. 12, a space area for three pieces of index information is present in the page 1 and three pieces of index information <30,10>, <155,15>, and <155, 20> are registered anew. In the figure, the index information is represented in a form in which a structure identifier and an occurrence position are omitted (<document identifier, element identifier>).

In this case, whereas a node range before registration is [<10,20>, <25,12>], the node range is expanded to [<10,20>, <155,20>] after the three pieces of index information are registered as shown on the right side in the figure. Therefore, a solution presence range in one page increases and it is more likely that it cannot be judged that scan is unnecessary in page units.

On the other hand, in this embodiment, even if a space area is present in the page 1, when a storage ratio exceeds the predetermined storage ratio, the index information <155,10> and <155,20> as a factor of expansion of the node range can be arranged in another page.

FIG. 13 is a diagram for explaining an example in which, as in FIG. 12, a space area for three pieces of index information is present in the page 1 and three pieces of index information <30,10>, <155,15>, and <155,20> are registered anew.

As shown in FIG. 13, in the method according to this embodiment, for example, only the index information <30, 10> having a small increase ratio of a node range can be added to the page 1 and the other pieces of index information can be added to the page 2 created anew. Therefore, because the node range of the page 1 is [<10,20>, <30,10>], the range can be prevented from becoming excessively large.

The document identifiers can be changed until the document identifiers are actually arranged in the page. Thus, it can be verified whether a distribution of the document identifiers is reduced by changing the document identifiers when a document is registered or the distribution is reduced by exchanging values of the document identifiers with values of other document identifiers not arranged in the page yet.

The document identifier is a value uniquely determined in the structured document managing apparatus 100 and issued and managed by the structured document managing apparatus 100. For example, a value obtained by adding 1 to a maximum value at the present point is returned when a structured document can be registered and, when a document is deleted, document identifiers given to the document can be managed as idle numbers. In this case, when another new document is registered, it is possible to select and allocate idle numbers with which the distribution is reduced and allocate the idle numbers.

FIG. 14 depicts an example in which document identifiers are simply allocated in order from one with a smallest idle number. In the figure, when a first element of the page 2 is registered, a minimum value 18 of the idle numbers is allocated. Thus, a node range is [<18,10>, <40,30>].

On the other hand, FIG. 15 is a diagram for illustrating an example in which an idle number 35 with which a node range of the page 2 is minimized among idle numbers is selected and allocated as a document identifier. Therefore, the node range of the page 2 is [<35,10>, <40,30>] and expansion of the node range is prevented compared with the example in FIG. 14.

In the examples shown in FIGS. 14 and 15, an idle number is selected and allocated when a vocabulary index is registered anew. However, it can be checked whether a node range can be reduced by replacing a document identifier with an idle number for a vocabulary index already registered.

In this case, the document identifier needs to be changed not only in the object vocabulary index but also all vocabulary indexes in which this document identifier is used. Therefore, it is desirable to adjust a value of the idle number taking into account importance in retrieval of vocabularies.

Figure 16:
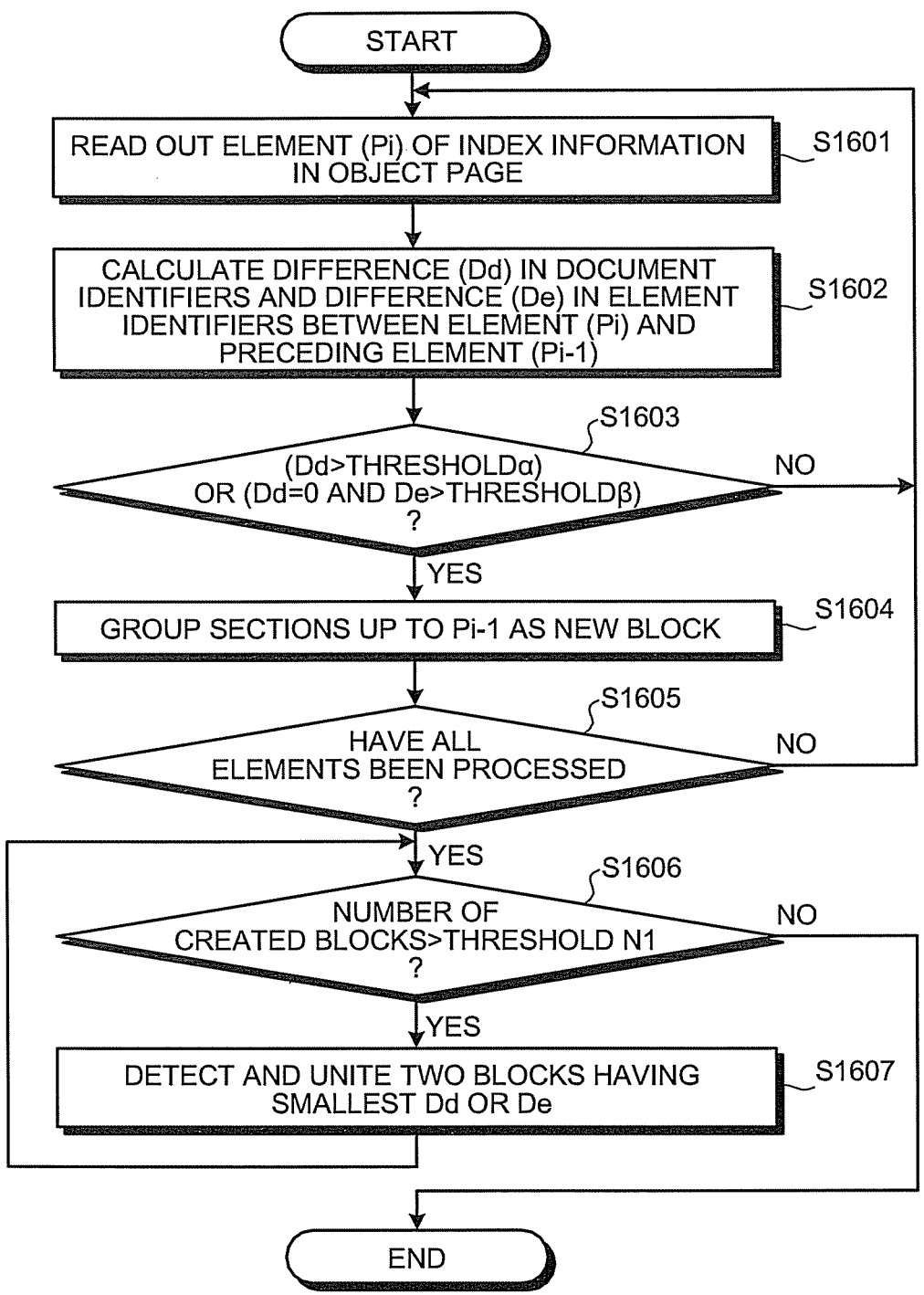
FIG. 16 is a flowchart of an overall flow of block division processing based on a node range.

Details of the block division processing based on a node range at step S1005 are explained with reference to FIGS. 16 and 17.

In the page determination processing described above, because storage efficiency and the like of a page are taken into account, as a result, pages tend to be roughly filtered. Because heading information is calculated for all pieces of information in the page, accuracy of the information falls as the number of pieces of information in the page increases. To prevent such problems, it is an object of the block division processing based on a node range to correct the heading information again after the page is determined or at a stage when the number of pieces of index information in the page reaches a maximum number.

The characteristic analyzing unit 114 reads out one element (hereinafter, "Pi") of a vocabulary index from an object page as an object of block division (step S1601). For example, when vocabulary indexes shown in FIG. 17 are stored in a page, first, the characteristic analyzing unit 114 reads out a vocabulary index <10,20,5> as P1. In the figure, index information is represented in a form in which an occurrence position is omitted (<document identifier, element identifier, structure identifier>).

The characteristic analyzing unit 114 calculates a difference in the document identifier (hereinafter, "Dd") and a difference in the element identifier (hereinafter, "De") between the preceding element (Pi−1) and the present element (Pi) (step S1602). The first element (P1) is excluded from processing objects of this step because a preceding element of the first element is not present.

The dividing unit 115 judges whether Dd is larger than a predetermined threshold value α or whether Dd=0 and De is larger than a predetermined threshold value β (step S1603). When a condition Dd>α or Dd=0 and De>β is not satisfied ("NO" at step S1603), the characteristic analyzing unit 114 reads out the next element and continues the processing (step S1601).

When the condition Dd>α or Dd=0 and De>β is satisfied ("YES" at step S1603), the dividing unit 115 groups a section up to Pi−1 as a new block (step S1604). For example, when α=15 and β=10, in the example in FIG. 17, the condition at step S1603 is satisfied in a sixth element P6=<15,20,5> and a seventh element P7=<35,10,9>. Therefore, elements P1 to P6 are divided as one block.

As a reference in reuniting the divided blocks (described later), the dividing unit 115 stores values of Dd and De at this point. In the example described above, the dividing unit 115 stores Dd=20 and De=10. In the respective blocks, node ranges of the respective blocks (hereinafter, "intra-page node ranges") are stored in association with each other as heading information for the respective blocks. This makes it possible to judge, referring to the heading information, to a range of which of the blocks a solution candidate belongs.

The dividing unit 115 judges whether all the elements have been processed (step S1605). When all the elements have not been processed ("NO" at step S1605), the characteristic analyzing unit 114 reads out the next element and continues the processing (step S1601).

When all the elements have been processed ("YES" at step S1605), the dividing unit 115 executes processing described below to adjust the number of blocks.

The dividing unit 115 judges whether the number of created blocks is larger than a predetermined threshold value N1 defining an upper limit of the number of blocks (step S1606). When the number of blocks is larger than N1 ("YES" at step S1606), the dividing unit 115 unites the blocks according to a predetermined rule. Specifically, the dividing unit 115 detects, referring to Dd and De stored during creation of a new block, two blocks in which Dd or De for two pieces of index information present at a boundary dividing the blocks are minimized and unites the blocks (step S1607).

When the number of blocks is not larger than N1 ("NO" at step S1606), the dividing unit 115 finishes the block division processing based on a node range.

As described above, in the block division processing based on a node range, in the same manner as the page determination processing, it is possible to further divide, taking into account distributions of document identifiers and element identifiers, a page into blocks such that the respective identifiers are appropriately distributed in the page.

Figure 18:
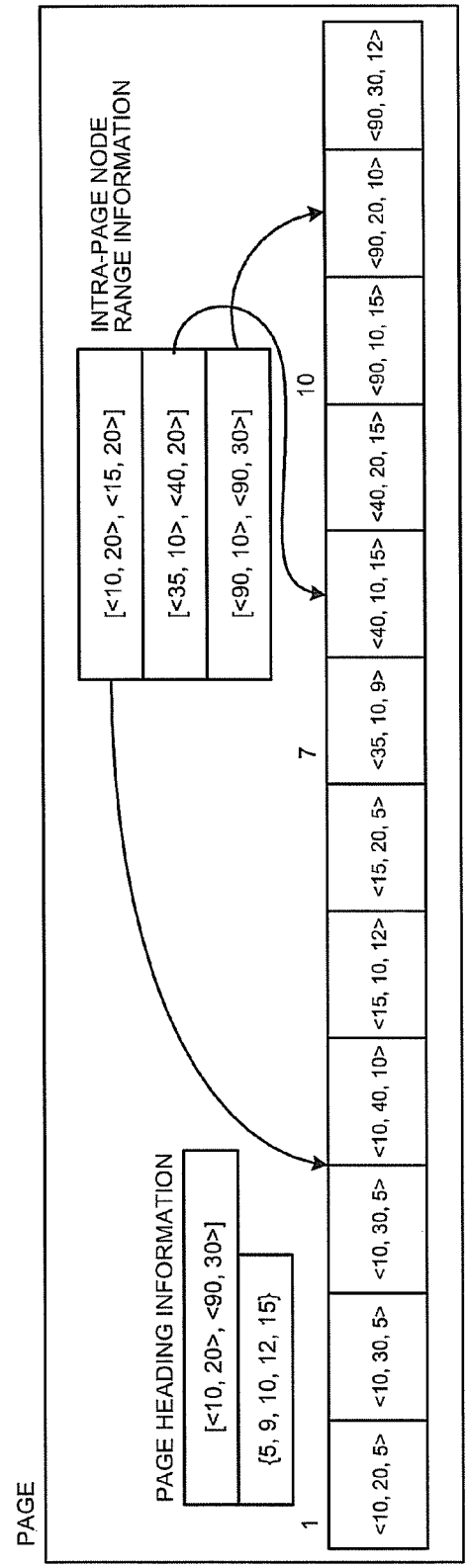
FIG. 18 is a diagram for illustrating an example of a page of the inverted list after division.

A specific example of a page divided by the block division processing based on a node range is explained with reference to FIG. 18. FIG. 18 is a diagram for explaining an example of a page of an inverted list after being divided by the block division processing based on a node range. In FIG. 18, a result obtained by dividing the page in FIG. 17 with the procedure in FIG. 16 is shown. As shown in FIG. 18, elements of twelve pieces of index information are divided into three blocks. In the respective blocks, information representing a start position (1, 7, and 10) and intra-page node ranges ([<10,20>, <15,20>], [<35,10>, <40,20>], and [<90,10>, <90,30>]) are stored in association with each other.

Details of the block division processing based on a structure set at step S1006 are explained with reference to FIGS. 19 and 22.

The block division processing based on a structure set is processing for dividing index information in a page into a plurality of blocks taking into account a distribution of structure identifiers. As a specific method of the processing, various methods are conceivable. As an example, two methods are explained below.

Figure 19:
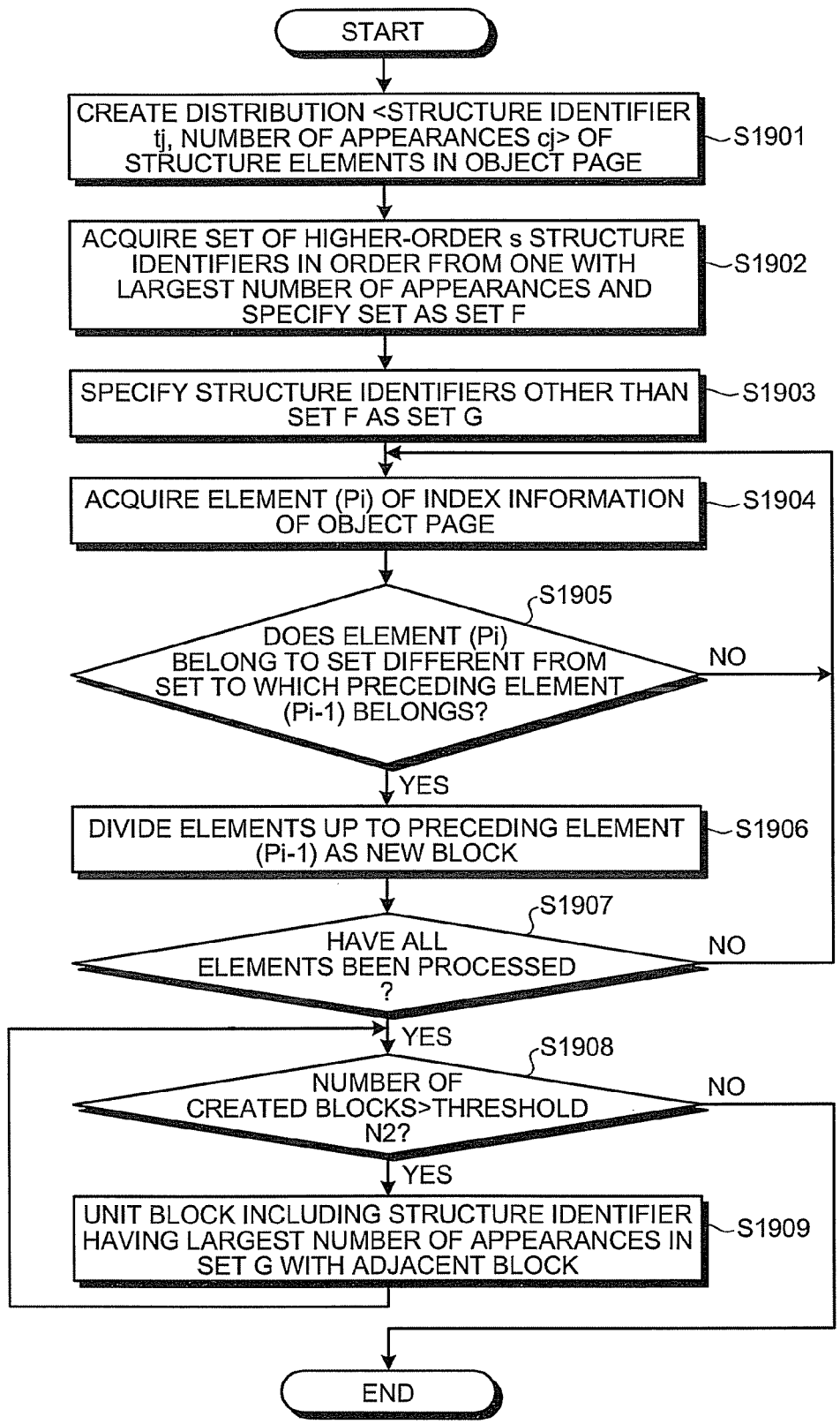
FIG. 19 is a flowchart of an overall flow of block division processing based on a structure set.

(A) A method mainly aiming at retrieving characteristic structure identifiers at high speed (FIG. 19)

Figure 22:
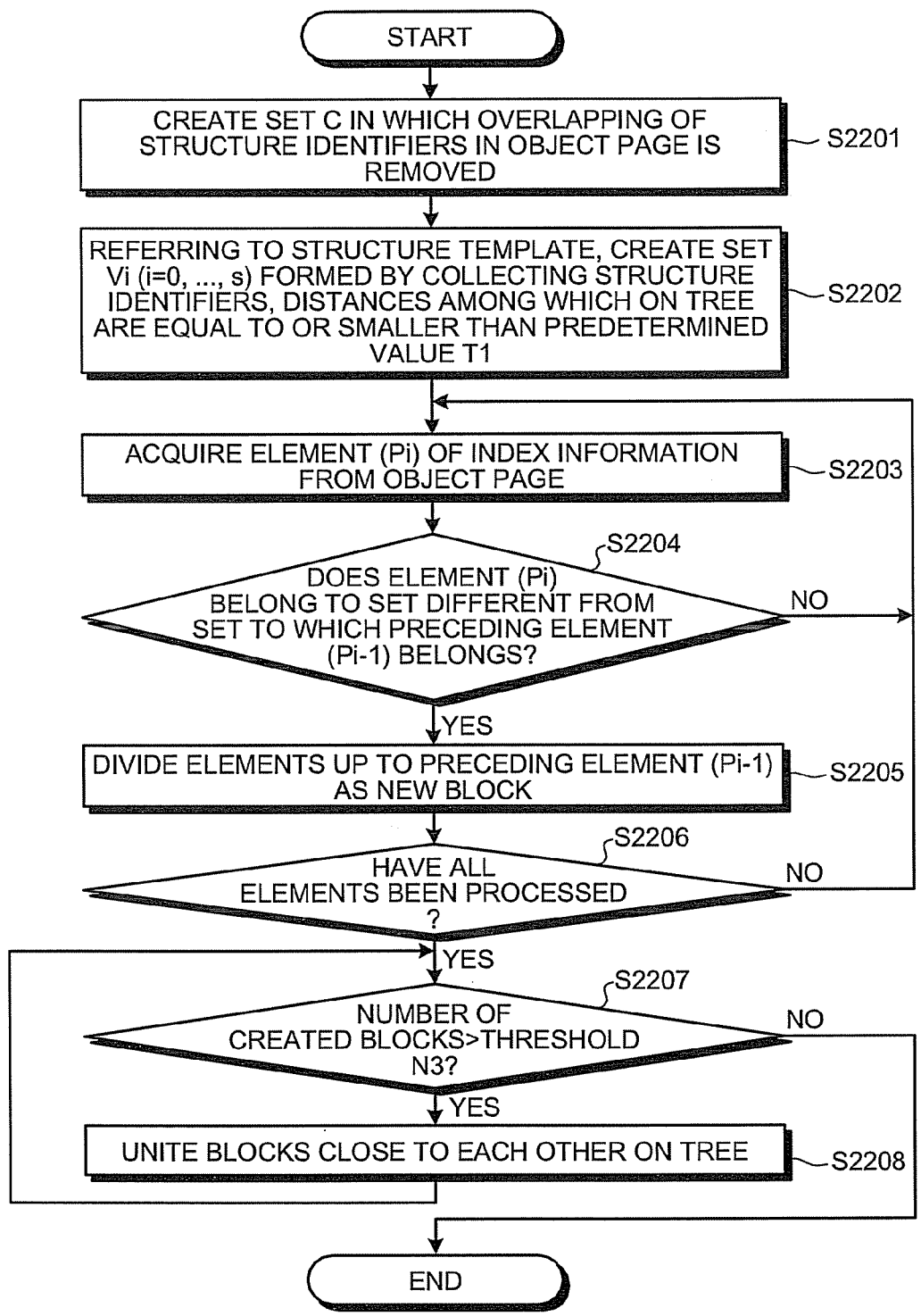
FIG. 22 is a flowchart of an overall flow of block division processing based on a structure set.

(B) A method mainly aiming at performing hierarchical retrieval at high speed using "//" in XPath (FIG. 22)

The two methods are not alternative. Any one of the methods can be executed or both the methods can be executed.

First, the method A is explained with reference to FIG. 19. It is an object of the method A to increase speed in retrieving structure identifiers corresponding to structure elements having small appearance frequencies as characteristic structure identifiers.

First, the characteristic analyzing unit 114 creates, for an object page as an object of block division, a distribution of structure elements <structure identifier tj, number of appearances cj> in the object page (step S1901). <structure identifier tj, number of appearances cj> represents information in which the number of appearances in a page of each of structure identifiers is associated with each of the structure identifiers.

FIG. 20 is a diagram for explaining an example of a distribution of created structure elements. In FIG. 20, an example in which a distribution of structure elements is created for the page in FIG. 17 is shown. As shown in FIG. 20, in the example in FIG. 17, the number of appearances of a structure element with a structure identifier 5 is the largest. This is analyzed as a characteristic of the structure identifiers.

Referring back to FIG. 19, the characteristic analyzing unit 114 acquires higher-order "s" structure identifiers decided in advance in order from a structure identifier with the largest number of appearances cj and specifies the acquired structure identifiers as a set F (step S1902). The characteristic analyzing unit 114 specifies the structure identifiers other than the set F as a set G (step S1903).

When s=2 is decided, in the example in FIG. 20, structure identifiers 5 and 15 having large numbers of appearances are classified into the set F as frequently occurring structure identifiers. Other structure identifiers 10, 12, and 9 are classified into the set G.

The dividing unit 115 reads out one element (Pi) of a vocabulary index from the object page (step S1904). The dividing unit 115 judges whether a structure identifier in Pi belongs to a set different from a set to which a structure identifier of the preceding element (Pi−1) belongs (step S1905). For example, when the structure identifier of the element Pi−1 belongs to the set F and the structure identifier of the element Pi belongs to the set G, the dividing unit 115 judges that both the structure identifiers belong to the different sets.

When the structure identifier of Pi belongs to a set different from a set to which the structure identifier of the preceding element (Pi−1) belongs ("YES" at step S1905), the dividing unit 115 divides elements up to the preceding element (Pi−1) as a new block (step S1906). This makes it possible to divide the page into blocks for each set of structure identifiers having equivalent numbers of appearances.

When the structure identifier of Pi does not belong to a set different from a set to which the structure identifier of the preceding element (Pi−1) belongs ("NO" at step s1905) or after the elements are divided as a block at step S1906, the dividing unit 115 judges whether all the elements have been processed (step S1907).

When all the elements have not been processed ("NO" at step S1907), the characteristic analyzing unit 114 reads out the next element and continues the processing (step S1904).

When all the elements have been processed ("YES" at step S1907), the dividing unit 115 executes processing described below to adjust the number of blocks.

First, the dividing unit 115 judges whether the number of created blocks is larger than a predetermined threshold value N2 defining an upper limit of the number of blocks (step S1908). When the number of blocks is larger than N2 ("YES" at step S1908), the dividing unit 115 unites the blocks according to a predetermined rule. Specifically, the dividing unit 115 finds a block including a structure identifier having a largest number of appearances in the set G and unites the found block with a block adjacent thereto (step S1909). This makes it possible to reduce the influence on rare structure identifiers while keeping blocks having small numbers of appearances.

When the number of blocks is not larger than N2 ("NO" at step S1908), the dividing unit 115 finishes the block division processing based on a structure set.

As described above, in the block division processing based on a structure set, the blocks are divided according to appearance frequencies of the structure identifiers. Thus, a limited search space for structure identifiers having low appearance frequencies is prevented from being unreasonably increased by frequently occurring structure identifiers.

Figure 21:
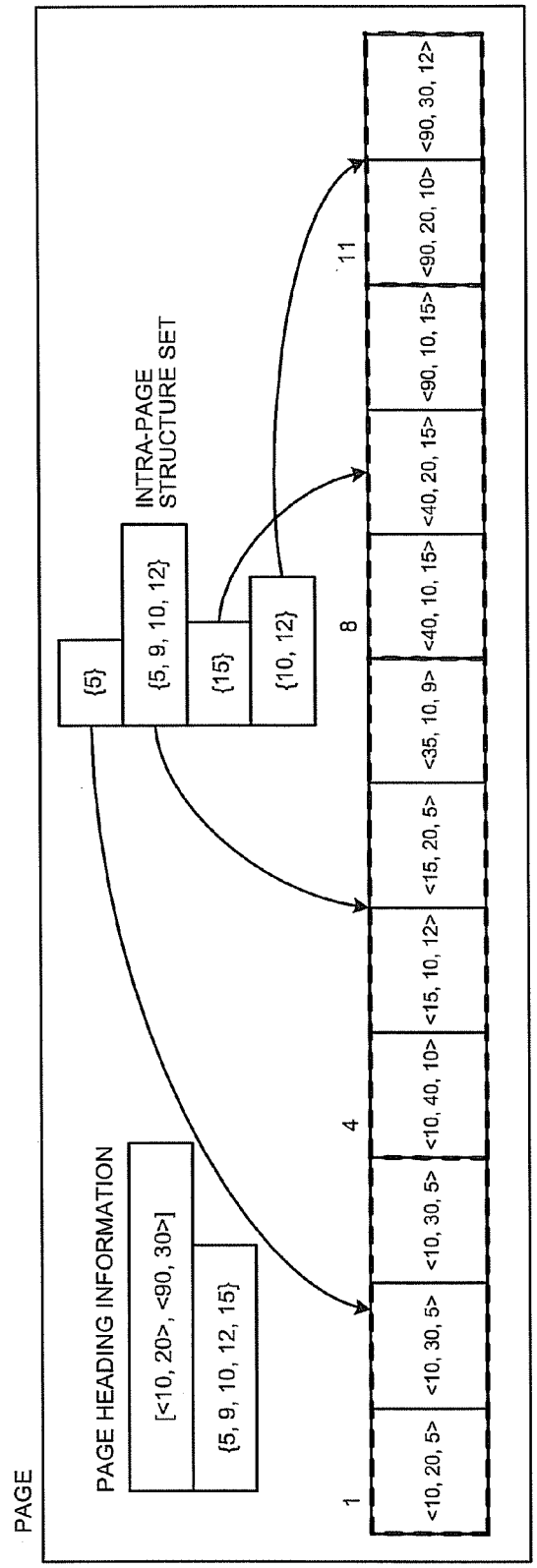
FIG. 21 is a diagram for illustrating an example of a page of the inverted list after division.

A specific example of a page divided by the block division processing based on a structure set is explained with reference to FIG. 21. FIG. 21 is a diagram for explaining an example of a page of an inverted list after being divided by the block division processing based on a structure set. When s=2 (structure identifiers having higher-order two numbers of appearances is specified as the set F) and N2=4 (an upper limit of the number of blocks is 4), as shown in FIG. 20, higher-order frequency occurring structure identifiers are 5 and 15. These structure identifiers are classified into the set F. The other structure identifiers 10, 12, and 9 are classified into the set G. In the example in FIG. 17, a structure identifier of index information up to third index information from the left is 5 and a structure identifier of elements of fourth index information is 10. Thus, first index information to third index information from the left are divided as one block.

According to the same method, as a whole, the page is divided into six blocks in total of first index information to third index information, fourth index information to fifth index information, sixth index information, seventh index information, eighth index information to tenth index information, and eleventh index information to twelfth index information. In this case, because the number of blocks exceeds the upper limit 4, the block of fourth index information to fifth index information including 10 as the structure identifier having the largest number of appearances is united with a block adjacent thereto. Finally, the page is divided into four blocks in total of first index information to third index information, fourth index information to seventh index information, eighth index information to tenth index information, and eleventh index information to twelfth index information.

The method B is explained with reference to FIG. 22. In retrieval concerning a structured document, for example, as in "text//text( )", a mark "//" representing a path of any lower-order hierarchy is often designated as a path to be retrieved. It is an object of the method B to increase speed in retrieval for designating constraints of a hierarchical structure peculiar to such a structured document.

First, the characteristic analyzing unit 114 creates, for an object page to be an object of block division, a set C in which overlapping of structure identifiers in the object page is removed (step S2201). The characteristic analyzing unit 114 creates, referring to the structure template in the structure storing unit 142, sets Vi (i=0, . . . , s) formed by collecting structure identifiers, distances among which on a tree are equal to or smaller than a predetermined value T1 (step S2202). The sets Vi are created such that one structure identifier belongs to only any one of the sets Vi. For example, sets are created from an end side of the tree and, for remaining structure elements, sets are further created one after another toward a higher-order side of the tree.

The dividing unit 115 reads out one element (Pi) of a vocabulary index from the object page (step S2203). The dividing unit 115 judges whether a structure identifier of Pi belongs to a set different from a set to which a structure identifier of the preceding element (Pi−1) belongs (step S2204). For example, when the structure identifier of the element Pi−1 belongs to a set V1 and the structure identifier of the element Pi belongs to a set V2, the dividing unit 115 judges that both the structure identifiers belong to different sets.

When the structure identifier of Pi belongs to a set different from a set to which the structure identifier of the preceding element (Pi−1) belongs ("YES" at step S2204), the dividing unit 115 divides elements up to the preceding element (Pi−1) as a new block (step S2205). This makes it possible to divide the page into blocks for each set of structure identifiers that are close to one another on the structure template.

When the structure identifier of Pi does not belong to a set different from a set to which the structure identifier of the receding element (Pi−1) belongs ("NO" at step S2204) or after the elements are divided as a block at step S2205, the dividing unit 115 judges whether all the elements have been processed (step S2206).

When all the elements have not been processed ("NO" at step S2206), the characteristic analyzing unit 114 reads out the next element and continues the processing (step S2203).

When all the elements have been processed ("YES" at step S2206), the dividing unit 115 executes processing described below to adjust the number of blocks.

First, the dividing unit 115 judges whether the number of created blocks is larger than a predetermined threshold value N3 defining an upper limit of the number of blocks (step S2207). When the number of blocks is larger than N3 ("YES" at step S2207), the dividing unit 115 unites the blocks according to a predetermined rule. Specifically, the dividing unit 115 finds blocks closest to each other on a tree and unites the blocks each other (step S2208).

When the number of blocks is not larger than N3 ("NO" at step S2207), the dividing unit 115 finishes the block division processing based on a structure set.

As described above, in the method B, the structure identifiers close to one another on the structure template are blocked as an identical group. Thus, it is possible to narrow down a search space to limit the search space to only a path indicated by the user.

As a modification of the method B, the block division processing based on a structure set can be realized by a method described below. First, the structure template is scanned and structure identifiers in a parent child relation from an end element are preferentially collected as blocks. When the number of blocks obtained in this way is equal to or smaller than N3 set beforehand, the processing is finished.

Otherwise, brother elements are further checked and structure identifiers in a brother relation are united in the same block. When the number of blocks obtained in this way exceeds the upper limit of the number of blocks, the same processing is performed from the end element to a higher-order node on the structure template. Such processing is repeated until the number of blocks is reduced to be smaller than N3.

As described above, according to this embodiment, in addition to arranging a vocabulary index in an appropriate page referring to range information of the respective identifiers, it is possible to create an index in which respective pages are further divided into blocks with the range information of the respective identifiers and an index in which the respective pages are further divided into blocks with constraints concerning structure elements. Consequently, it is possible to improve accuracy of narrowing down the search space and execute faster retrieval.

Figure 23:
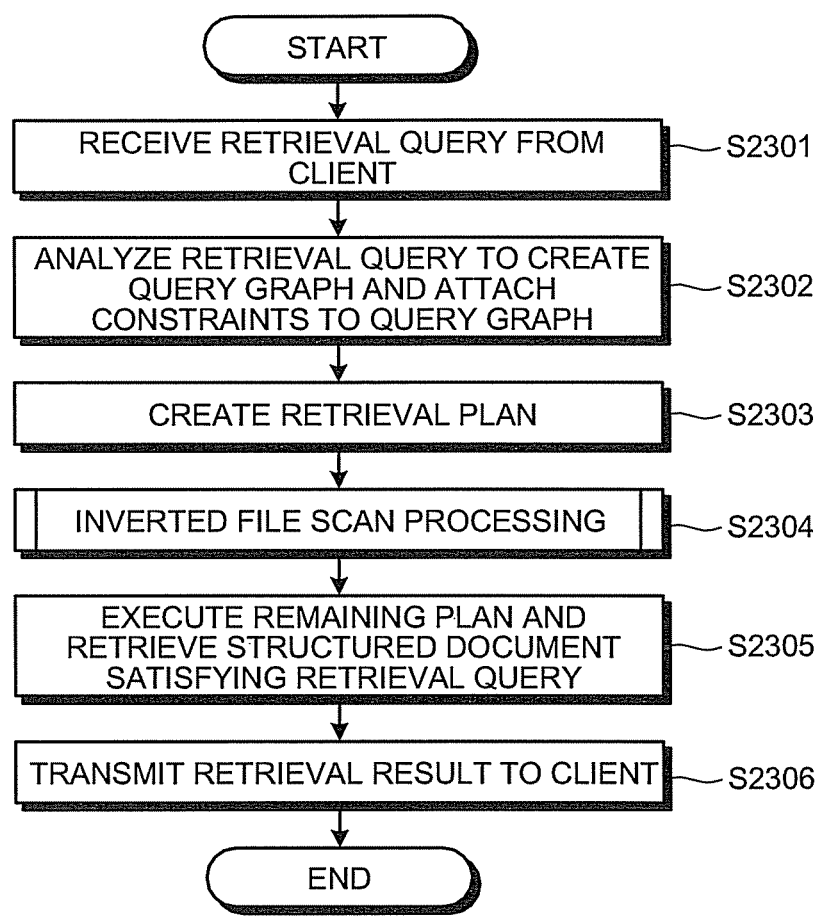
FIG. 23 is a flowchart of an overall flow of retrieval processing according to the embodiment.

Retrieval processing employing the index created in this way is explained with reference to FIG. 23.

First, the communication unit 101 receives a retrieval query from the client 300 (step S2301). The constraint creating unit 121 analyzes the received retrieval query and creates a query graph shown in FIG. 9 (step S2302). As described above, constraints that respective notes on the graph have to satisfy are attached to the query graph.

The retrieving unit 120 creates, referring to the created query graph, a retrieval plan in which processing cost is minimized (step S2303). In plan creation processing by the retrieving unit 120, a method same as that disclosed in JP-A 2001-147933(KOKAI) can be applied.

Inverted file scan processing that is processing concerning a vocabulary index in the retrieval processing is executed (step S2304). In the inverted file scan processing, processing for narrowing down candidates of an index to be retrieved is executed according to the attached constraints. Details of the inverted file scan processing are described later.

The retrieving unit 120 executes the remaining plan and retrieves a structured document that satisfies the retrieval query (step S2305). The communication unit 101 transmits the retrieved structured document to the client 300 as a retrieval result (step S2306) and finishes the retrieval processing.

Figure 24:
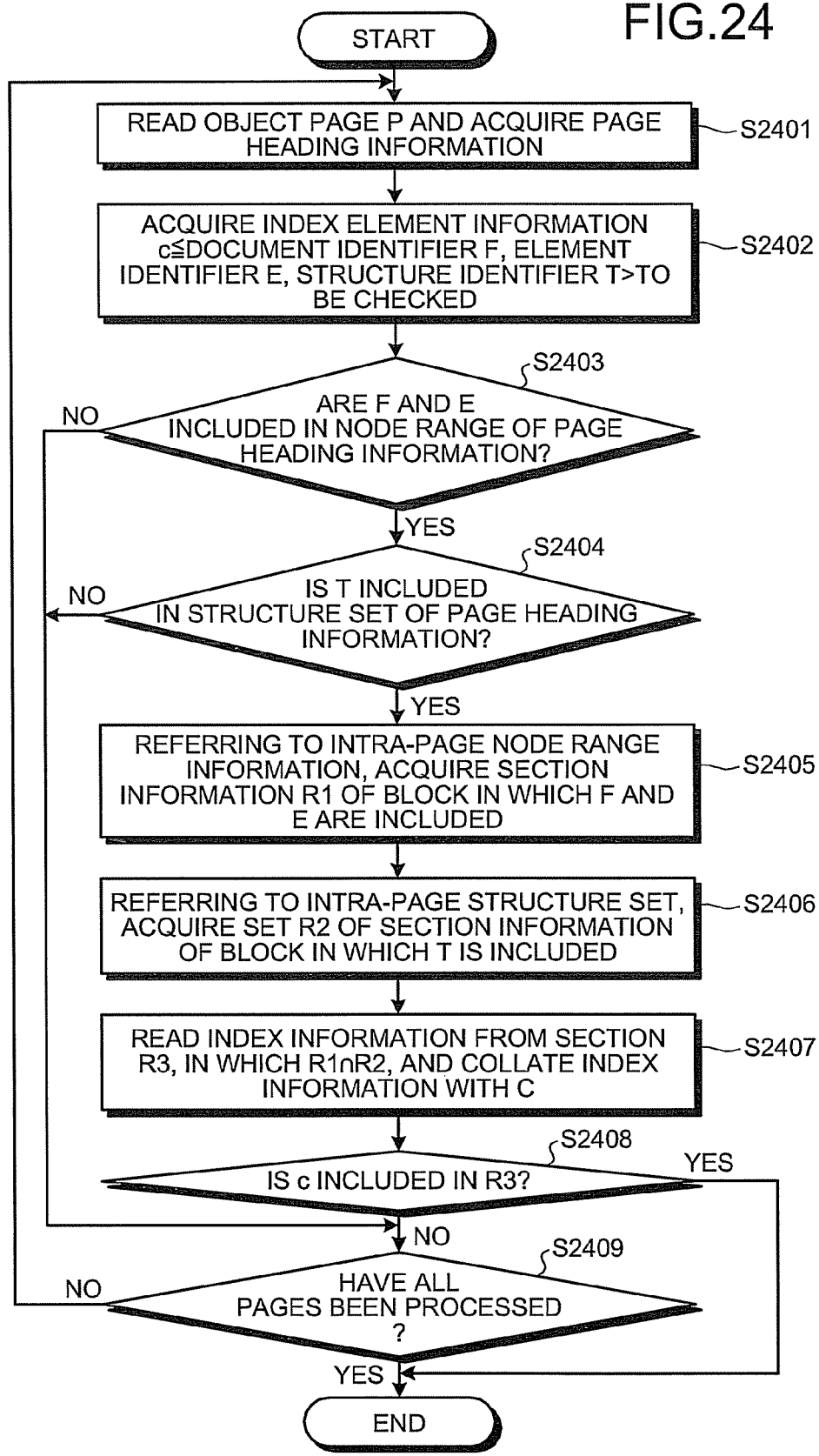
FIG. 24 is a flowchart of an overall flow of inverted file scan processing according to the embodiment.

The inverted file scan processing at step S2304 is explained with reference to FIG. 24.

First, the page reading unit 122 reads an object page (hereinafter, "P") representing a page to be searched through and acquires heading information of the read page (hereinafter, "page heading information") (step S2401).

The page judging unit 123 acquires index element information c=<document identifier F, element identifier E, structure identifier F> to be checked (step S2402). The index element information to be checked is obtained by processing of an operator performed before the inverted file scan processing.

The page judging unit 123 judges whether the document identifier F and the element identifier E are included in a node range of the page heading information (step S2403). When the document identifier F and the element identifier E are included in the node range ("YES" at step S2403), the page judging unit 123 further judges whether the structure identifier T is included in a structure set of the page heading information (step S2404).

When the structure identifier T is included in the structure set ("YES" a step S2404), processing described below is executed to further judge a block corresponding to the identifiers. First, the block judging unit 124 acquires, referring to the intra-page node range, section information R1 of a block in which the document identifier F and the element identifier E are included (step S2405).

The section information of a block is information for specifying a range of index information included in respective blocks. For example, in the example in FIG. 18, information such as 1 to 6, 7 to 9, and 10 to 12 can be acquired as section information for each of three blocks from 1, 7, and 10 that are information representing start positions of the blocks.

The block judging unit 124 acquires, referring to the intra-page structure set, a set R2 of section information of a block in which the structure identifier T is included (step S2406). The block judging unit 124 calculates a section R3 representing a portion common to the section R1 and respective sections in the set R2, reads index information from the calculated section R3, and collates the index information with c=<document identifier F, element identifier E, structure identifier T> (step S2407).

The block judging unit 124 judges whether "c" is included in R3 (step S2408). When "c" is not included in R3 ("NO" at step S2408), the page reading unit 122 judges whether all the pages have been processed (step S2409). When all the pages have not been processed ("NO" at step S2409), the page reading unit 122 reads the next page and repeats the processing (step S2401).

When all the pages have been processed ("YES" at step S2409), the inverted file scan processing ends considering that a vocabulary index satisfying the index element information "c" to be checked is not present.

When it is judged in step S2408 that "c" is included in R3 ("YES" at step S2408), the inverted file scan processing ends considering that a vocabulary index satisfying the index element information "c" to be checked is present.

When it is judged at step S2403 that the document identifier F and the element identifier E are not included in the node range of the page heading information ("NO at step S2403) and when it is judged in step S2404 that the structure identifier T is not included in the structure set of the page heading information ("NO" at step S2404), search through the object page is skipped and end judgment processing at step S2409 is executed.

As described above, according to this embodiment, it is possible to limit a search space and increase speed of retrieval by performing three stages of check for (1) narrowing down global structure constraints in a query, (2) narrowing down a heading of a page, and (3) narrowing down blocks in the page.

A specific example of the retrieval processing according to this embodiment is explained. First, an example of limitation of a search range by the page heading information is explained with reference to FIGS. 25 and 26.

Figure 25:
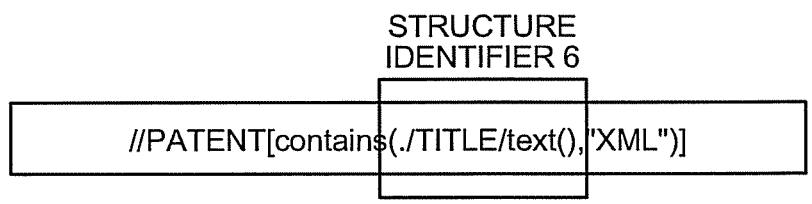
FIG. 25 is a diagram for illustrating an example of a retrieval query.
Figure 26:
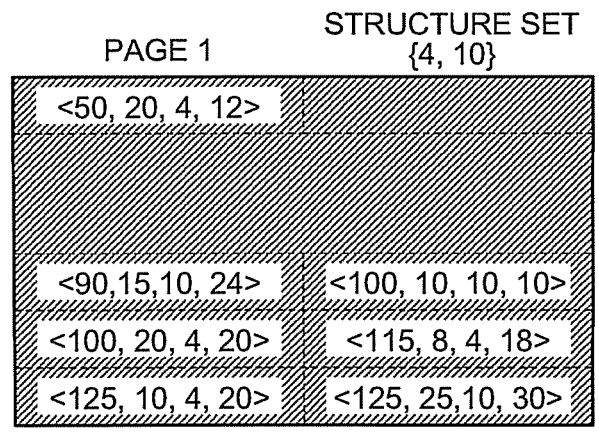
FIG. 26 is a diagram for illustrating an example of a vocabulary index.

FIG. 25 depicts an example of a retrieval query in retrieving a patent document including "XML" in a text (structure identifier=6) below a title tag. In FIG. 26, because only a structure identifier 4 or 10 is included in the page 1, a structure set is {4,10}.

When candidates of the structure identifier 6 are retrieved from the page 1 shown in FIG. 26 based on the retrieval query shown in FIG. 25, it is possible to skip the search through the page 1 because only {4,10} is present as the structure set.

An example of limitation of a search range by the page heading information is explained with reference to FIG. 27. A vocabulary index is on the premise that the information shown in FIG. 17 is stored and divided into the blocks shown in FIGS. 18 and 21 by the block division processing based on a node range and the block division processing based on a structure set, respectively.

Figure 27:
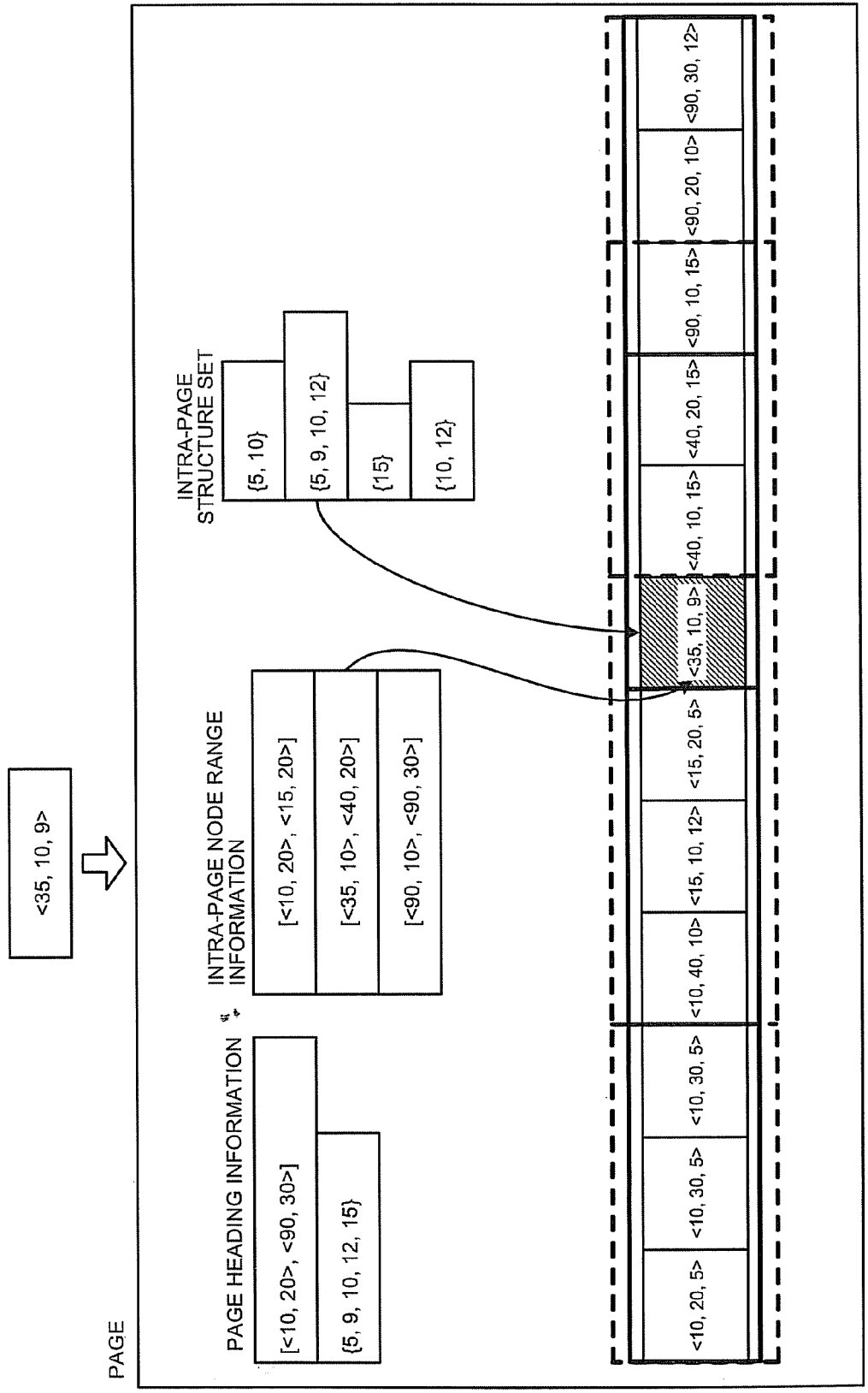
FIG. 27 is a diagram for explaining an example of a limitation on a search range.

FIG. 27 depicts an example in which collation is performed with, for example, index element information <35,10,9> as a check object on the premise described above.

First, from the page heating information, it is checked whether the collation can be skipped in page units (steps S2403 and 2404). A condition of a node range is checked and it is judged that the document identifier 35 and the element identifier 10 are included in a node range [<10,20>, <90,30>] ("YES" at step S2403).

A condition of structure information is checked and it is judged that the structure identifier 9 is included in {5,9,10, 12,15}, which is a structure set of the page heading information ("YES" at step S2404). Therefore, search through a page (steps S2405 to S2408) is executed.

In the search through the page, first, the block R1 including <35,10> is acquired from the intra-page node range. In this example, because a second block satisfies the conditions, this block is acquired as a search section (step S2405). The block is collated with the intra-page structure set. In this example, because a block including the structure identifier 9 is only the second block, the set R2 of sections is only the second block (step S2406).

After these kinds of processing are finished, a product set R3 of respective sections (R1, R2) is calculated. In this example, a section including only one index element <35,10, 9> is R3. Therefore, collation processing is performed with elements of R3 as solution candidates (step S2407) and the processing for the page is finished.

As described above, according to this embodiment, it is possible to further increase speed of the retrieval processing by narrowing down the search space referring to not only the page heading information but also the heading information for each of the divided blocks.

As described above, in the structured document managing apparatus according to this embodiment, the respective pages of the inverted list can be divided into a plurality of blocks taking into account characteristics concerning distributions of document identifiers and the like. A vocabulary index in which ranges of document identifiers and the like included in the respective blocks are associated with one another can be created. Therefore, it is possible to increase speed of retrieval by preventing access to unnecessary blocks referring to the ranges.

Figure 28:
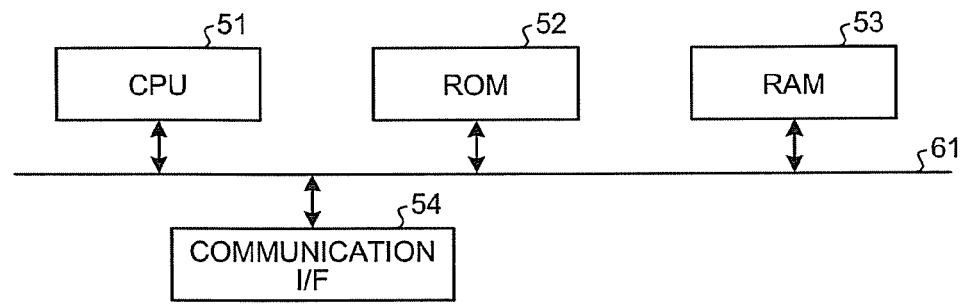
FIG. 28 is a hardware configuration diagram for illustrating a structured document managing apparatus according to the embodiment.

A hardware configuration of the structured document managing apparatus according to this embodiment is explained with reference to FIG. 28.

The structured document managing apparatus according to this embodiment includes a control device such as a central processing unit (CPU) 51, storage devices such as a read only memory (ROM) 52 and a random access memory (RAM) 53, a communication I/F 54 that is connected to a network to perform communication, external storage devices such as a hard disk drive (HDD) and a compact disc (CD) drive, a display device such as a display, input devices such as a keyboard and a mouse, and a bus 61 that connects the respective devices. The structured document managing apparatus has a hardware configuration including a normal computer.

A structured document managing program executed in the structured document managing apparatus according to this embodiment is provided by being recorded in computer readable recording media such as a compact disk read only memory (CD-ROM), a flexible disk (FD), a compact disk recordable (CD-R), and a digital versatile disk (DVD) as a file of an installable format or an executable format.

The structured document managing program executed in the structured document managing apparatus according to this embodiment can be provided by being stored on a computer connected to a network such as the Internet and downloaded through the network. The structured document managing program executed in the structured document managing apparatus according to this embodiment can be provided or distributed through the network such as the Internet.

The structured document managing program executed in the structured document managing apparatus according to this embodiment can be provided by being incorporated in a ROM and the like in advance.

The structured document managing program executed in the structured document managing apparatus according to this embodiment is formed as a module including the respective units (the communication unit, the storing unit, and the retrieving unit). As actual hardware, the CPU 51 (a processor) reads out the structured document managing program from the storage media and executes the program, whereby the respective units are loaded onto a main storage and the respective units are formed on the main storage.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A structured document managing apparatus comprising:
an index storing unit that stores, in a page as a fixed-length storage area, a vocabulary index which associates vocabulary identifiers and specific information, the vocabulary identifiers identifying vocabularies included in a structured document having a layered logical structure, the specific information including document identifiers for identifying the structured document where the vocabularies appear and element identifiers for identifying elements where the vocabularies appear, the elements being actual information corresponding to the logical structure in the structured document;
a characteristic analyzing unit that analyzes a difference between the document identifiers of a pair of the vocabulary indexes adjacent to each other in the page and a difference between the element identifiers of a pair of the vocabulary indexes adjacent to each other in the page; and a dividing unit that
- judges whether the difference between the document identifiers exceeds a first threshold value,
- divides the page into a plurality of blocks between the vocabulary indexes where the difference between the document identifiers exceeds the first threshold value, each of the plurality of blocks including one of a plurality of the vocabulary indexes,
- judges whether the difference between the element identifiers exceeds a second threshold value decided in advance when the document identifiers coincide with each other,
- divides the page into the blocks between the vocabulary indexes where the difference between element identifiers exceeds the second threshold value,
- calculates a first range representing a range of the specific information of the vocabulary indexes included in the blocks, and
- stores the first range in each of the divided blocks in the index storing unit.

2. The apparatus according to claim 1, wherein
the index storing unit stores the vocabulary index which associates the specific information as structure identifiers for identifying structure elements where the vocabularies appear among structure elements as units of the logical structure, and
the characteristic analyzing unit analyzes a characteristic of a distribution of the structure identifiers included in the vocabulary index stored in the page.

3. The apparatus according to claim 2, wherein
the characteristic analyzing unit analyzes a number of appearances in the page of the structure elements corresponding to the structure identifiers as the characteristic, and
the dividing unit classifies the structure identifiers of a predetermined number of the structure elements into a first group in order from a largest number of appearances, classifies the structure identifiers not belonging to the first group into a second group, and divides the page into the blocks between the vocabulary indexes, when one of the structure identifiers included in a pair of the vocabulary indexes adjacent to each other in the page belongs to the first group and the other belongs to the second group.

4. The apparatus according to claim 2, wherein
the characteristic analyzing unit analyzes a number of layers in the logical structure among the structure elements corresponding to the structure identifiers as the characteristic, and
the dividing unit classifies the structure identifiers into groups including the structure identifiers of the structure elements, the number of layers among which is smaller than a predetermined third threshold value, and divides the page into the blocks between the vocabulary indexes, when the groups to which the structure identifiers included in a pair of the vocabulary indexes adjacent to each other in the page belong are different.

5. The apparatus according to claim 1, further comprising a retrieving unit that retrieves the block in which the specific information to be retrieved is included in the first range among the blocks included in the page as a retrieval object, when an input retrieval condition is analyzed to find the specific information to be retrieved from the vocabulary index and the specific information to be retrieved is retrieved from the page in the index storing unit.

6. The apparatus according to claim 1, wherein
the index storing unit further stores a second range representing a range of the specific information of the vocabulary index included in the page, for each of a plurality of the pages, and
the apparatus further includes a page determining unit that determines the page in which the vocabulary index to be registered is registered, when the vocabulary index is registered in the index storing unit, based on the specific information included in the vocabulary index to be registered and the second range stored in the index storing unit.

7. The apparatus according to claim 6, wherein the page determining unit creates a new page and determines the created page as the page to be registered, when a space area of the page that can be a registration object is smaller than a predetermined fourth threshold value and a ratio of the second range at the time when the vocabulary index is registered in the page that can be a registration object with respect to the second range of the page that can be a registration object is larger than a fifth predetermined threshold value.

8. The apparatus according to claim 6, further comprising a retrieving unit that retrieves the specific information with the page in which the specific information to be retrieved is included in the second range of the page among the pages as a retrieval object, when an input retrieval condition is analyzed to find the specific information to be retrieved from the vocabulary index and the specific information to be retrieved is retrieved from the page in the index storing unit.

9. A structured document managing method comprising:
analyzing a difference between document identifiers of a pair of vocabulary indexes adjacent to each other in a page and a difference between element identifiers of a pair of the vocabulary indexes adjacent to each other in the page, the vocabulary index being stored in the page stored in an index storing unit that stores, in the page as a fixed-length storage area, the vocabulary index which associates vocabulary identifiers for identifying vocabularies included in a structured document having a layered logical structure and specific information including the document identifiers for identifying the structured document where the vocabularies appear and the element identifiers for identifying elements where the vocabularies appear, the elements being actual information corresponding to the logical structure in the structured document;
judging whether the difference between the document identifiers exceeds a first threshold value;
dividing the page into a plurality of blocks between the vocabulary indexes where the difference between the document identifiers exceeds the first threshold value, each of the plurality of blocks including one of a plurality of the vocabulary indexes;
judging whether the difference between the element identifiers exceeds a second threshold value decided in advance when the document identifiers coincide with each other;
dividing the page into the blocks between the vocabulary indexes where the difference between element identifiers exceeds the second threshold value; and
calculating a first range representing a range of the specific information of the vocabulary indexes included in the blocks, and storing the first range in each of the divided blocks in the index storing unit.

10. A non-transitory computer readable medium including programmed instructions for managing a structured document, wherein the instructions, when executed by a computer, cause the computer to perform:

analyzing a difference between document identifiers of a pair of vocabulary indexes adjacent to each other in a page and a difference between element identifiers of a pair of the vocabulary indexes adjacent to each other in the page, the vocabulary index being stored in the page stored in an index storing unit that stores, in the page as a fixed-length storage area, the vocabulary index which associates vocabulary identifiers for identifying vocabularies included in a structured document having a layered logical structure and specific information including the document identifiers for identifying the structured document where the vocabularies appear and the element identifiers for identifying elements where the vocabularies appear, the elements being actual information corresponding to the logical structure in the structured document;

judging whether the difference between the document identifiers exceeds a first threshold value;

dividing the page into a plurality of blocks between the vocabulary indexes where the difference between the document identifiers exceeds the first threshold value, each of the plurality of blocks including one of a plurality of the vocabulary indexes;

judging whether the difference between the element identifiers exceeds a second threshold value decided in advance when the document identifiers coincide with each other;

dividing the page into the blocks between the vocabulary indexes where the difference between element identifiers exceeds the second threshold value, and calculating a first range representing a range of the specific information of the vocabulary indexes included in the blocks, and storing the first range in each of the divided blocks in the index storing unit.

\* \* \* \* \*